US008490022B2

(12) United States Patent
Stone et al.

(10) Patent No.: US 8,490,022 B2
(45) Date of Patent: Jul. 16, 2013

(54) MENUS FOR AUDIOVISUAL CONTENT

(76) Inventors: Elizabeth Susan Stone, Sheffield (GB);
Stuart Antony Green, Sheffield (GB)

( * ) Notice: Subject to any disclaimer, the term of this patent is extended or adjusted under 35 U.S.C. 154(b) by 1328 days.

(21) Appl. No.: 11/792,973

(22) PCT Filed: Dec. 15, 2005

(86) PCT No.: PCT/EP2005/056836
§ 371 (c)(1),
(2), (4) Date: Sep. 26, 2008

(87) PCT Pub. No.: WO2006/064049
PCT Pub. Date: Jun. 22, 2006

(65) Prior Publication Data
US 2009/0034931 A1 Feb. 5, 2009

(30) Foreign Application Priority Data

Dec. 16, 2004 (GB) .................................. 0427535.0
Apr. 5, 2005 (GB) .................................. 0506890.3

(51) Int. Cl.
*G06F 3/048* (2006.01)
(52) U.S. Cl.
USPC ......................................................... 715/854
(58) Field of Classification Search
USPC ......................................................... 715/854
See application file for complete search history.

(56) References Cited

U.S. PATENT DOCUMENTS

| 5,751,369 | A | | 5/1998 | Harrison et al. | |
|---|---|---|---|---|---|
| 5,929,857 | A | * | 7/1999 | Dinallo et al. | ................ 715/840 |
| 5,990,972 | A | | 11/1999 | Bond-Harris et al. | |
| 6,469,718 | B1 | * | 10/2002 | Setogawa et al. | ............. 715/810 |
| 8,108,890 | B2 | * | 1/2012 | Green | .............................. 725/27 |
| 2002/0111968 | A1 | * | 8/2002 | Ching | .............................. 707/514 |
| 2002/0112226 | A1 | * | 8/2002 | Brodersen et al. | ............. 717/140 |
| 2003/0040962 | A1 | * | 2/2003 | Lewis | ................................ 705/14 |
| 2004/0044724 | A1 | * | 3/2004 | Bell et al. | ........................ 709/203 |
| 2004/0136698 | A1 | * | 7/2004 | Mock | .................................. 386/123 |
| 2005/0022232 | A1 | * | 1/2005 | Green | .................................. 725/32 |
| 2008/0022231 | A1 | * | 1/2008 | Tsai et al. | ........................ 715/840 |
| 2008/0219636 | A1 | * | 9/2008 | Green | .................................. 386/52 |
| 2008/0235585 | A1 | * | 9/2008 | Hart et al. | ...................... 715/717 |
| 2008/0307451 | A1 | * | 12/2008 | Green | .................................. 725/25 |

FOREIGN PATENT DOCUMENTS

| EP | 0898279 A2 | 2/1999 |
|---|---|---|
| EP | 1411512 A2 | 4/2004 |
| EP | 1463052 A1 | 9/2004 |

(Continued)

*Primary Examiner* — William Bashore
*Assistant Examiner* — Henry Orr
(74) *Attorney, Agent, or Firm* — Daniel W. Roberts; Law Offices of Daniel W. Roberts, LLC

(57) ABSTRACT

Embodiments of the present invention relate to audiovisual content authoring methods and systems and in particular to novel menu systems and the production thereof, for example implemented for DVD-Video discs. In one aspect, the present invention relates to a method of authoring an audiovisual product, for example a DVD-Video disc, comprising the steps of providing audiovisual content, generating at least a first menu (505) and a second menu (510), each menu comprising at least one menu option (506, 511), arranging the first menu (505) to be displayed during playback of the audiovisual content and arranging a menu option (506) of the first menu to cause display of the second menu during playback of the audiovisual content. Such a method facilitates hierarchical menu generation for DVD-Videos and the like.

41 Claims, 27 Drawing Sheets

FOREIGN PATENT DOCUMENTS

| | | |
|---|---|---|
| GB | 2402755 A | 12/2004 |
| JP | 10-74383 | 3/1998 |
| WO | 94/28480 | 12/1994 |
| WO | 99/38098 | 7/1999 |
| WO | 00/59214 | 10/2000 |
| WO | 2004/109699 A2 | 12/2004 |

* cited by examiner

| Pmno | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Video | Video | | | | | | | | | | | | | | | | | | | |
| Audio0 | English Audio | | | | | | | | | | | | | | | | | | | |
| Audio1 | French Audio | | | | | | | | | | | | | | | | | | | |
| Audio2 | Spanish Audio | | | | | | | | | | | | | | | | | | | |
| Audio3 | Dutch Audio | | | | | | | | | | | | | | | | | | | |
| Subp0 | English Subtitles | | | | | | | | | | | | | | | | | | | |
| Subp1 | French Subtitles | | | | | | | | | | | | | | | | | | | |
| Subp2 | Spanish Subtitles | | | | | | | | | | | | | | | | | | | |
| Subp3 | Dutch Subtitles | | | | | | | | | | | | | | | | | | | |
| Subp4 | No Menu | No Menu | No Menu | No Menu | No Menu | No Menu | No Menu | No Menu | No Menu | No Menu | No Menu | No Menu | No Menu | No Menu | No Menu | No Menu | No Menu | No Menu | No Menu | |
| Subp5 | Active Menu | Active Menu | Active Menu | Active Menu | Active Menu | Active Menu | Active Menu | Active Menu | Active Menu | Active Menu | Active Menu | Active Menu | Active Menu | Active Menu | Active Menu | Active Menu | Active Menu | Active Menu | Active Menu | |
| Subp6 | Play Menu | Play Menu | Play Menu | Play Menu | Play Menu | Play Menu | Play Menu | Play Menu | Play Menu | Play Menu | Play Menu | Play Menu | Play Menu | Play Menu | Play Menu | Play Menu | Play Menu | Play Menu | Play Menu | |
| Subp7 | Bonus Menu | Bonus Menu | Bonus Menu | Bonus Menu | Bonus Menu | Bonus Menu | Bonus Menu | Bonus Menu | Bonus Menu | Bonus Menu | Bonus Menu | Bonus Menu | Bonus Menu | Bonus Menu | Bonus Menu | Bonus Menu | Bonus Menu | Bonus Menu | Bonus Menu | |
| Subp8 | Setup Menu | Setup Menu | Setup Menu | Setup Menu | Setup Menu | Setup Menu | Setup Menu | Setup Menu | Setup Menu | Setup Menu | Setup Menu | Setup Menu | Setup Menu | Setup Menu | Setup Menu | Setup Menu | Setup Menu | Setup Menu | Setup Menu | |
| Subp9 | Language | Language | Language | Language | Language | Language | Language | Language | Language | Language | Language | Language | Language | Language | Language | Language | Language | Language | Language | |
| Subp10 | Subtitle | Subtitle | Subtitle | Subtitle | Subtitle | Subtitle | Subtitle | Subtitle | Subtitle | Subtitle | Subtitle | Subtitle | Subtitle | Subtitle | Subtitle | Subtitle | Subtitle | Subtitle | Subtitle | |
| Subp11 | | | | | | | | | | | | | | | | | | | | |
| ... | | | | | | | | | | | | | | | | | | | | |
| Subp31 | | | | | | | | | | | | | | | | | | | | |
| HGlt | Hglt | Hglt | Hglt | Hglt | Hglt | Hglt | Hglt | Hglt | Hglt | Hglt | Hglt | Hglt | Hglt | Hglt | Hglt | Hglt | Hglt | Hglt | Hglt | |

Fig. 16

Subpicture stream 5, "Subpc5
    Instance 0; Start time = frame 0; Display image = NoMenu_sub.bmp
    Instance 1; Start time = frame 60; Display image = NoMenu_sub.bmp
    Instance 2; Start time = frame 120; Display image = NoMenu_sub.bmp
    Instance 3; Start time = frame 180; Display image = NoMenu_sub.bmp
    Instance 4; Start time = frame 240; Display image = NoMenu_sub.bmp
    Instance 5; Start time = frame 300; Display image = NoMenu_sub.bmp
    Instance 6; Start time = frame 360; Display image = NoMenu_sub.bmp
    Instance 7; Start time = frame 420; Display image = NoMenu_sub.bmp
    Instance 8; Start time = frame 480; Display image = NoMenu_sub.bmp
    Instance 9; Start time = frame 540; Display image = NoMenu_sub.bmp
Subpicture stream 6, "Subpc6
    Instance 0; Start time = frame 0; Display image = ActiveMenu_sub.bmp
    Instance 1; Start time = frame 60; Display image = ActiveMenu_sub.bmp
    ...
    Instance 9; Start time = frame 540; Display image = ActiveMenu_sub.bmp
Subpicture stream 7, "Subpc7
    Instance 0; Start time = frame 0; Display image = PlayMenu_sub.bmp
    ...
    Instance 9; Start time = frame 540; Display image = PlayMenu_sub.bmp
Subpicture stream 8, "Subpc8
    Instance 0; Start time = frame 0; Display image = BonusMenu_sub.bmp
    ...
    Instance 9; Start time = frame 540; Display image = BonusMenu_sub.bmp
Subpicture stream 9, "Subpc9
    Instance 0; Start time = frame 0; Display image = SetupMenu_sub.bmp
    ...
    Instance 9; Start time = frame 540; Display image = SetupMenu_sub.bmp
Subpicture stream 10, "Subpc10
    Instance 0; Start time = frame 0; Display image = LanguageMenu_sub.bmp
    ...
    Instance 9; Start time = frame 540; Display image = LanguageMenu_sub.bmp
Subpicture stream 11, "Subpc11
    Instance 0; Start time = frame 0; Display image = SubtitleMenu_sub.bmp
    ...
    Instance 9; Start time = frame 540; Display image = SubtitleMenu_sub.bmp

*Fig.22*

Highlight Stream
 Instance 0; Start time = frame 0; Use button set definition
 Instance 1; Start time = frame 60; Use button set definition
 Instance 2; Start time = frame 120; Use button set definition
 Instance 3; Start time = frame 180; Use button set definition
 Instance 4; Start time = frame 240; Use button set definition
 Instance 5; Start time = frame 300; Use button set definition
 Instance 6; Start time = frame 360; Use button set definition
 Instance 7; Start time = frame 420; Use button set definition
 Instance 8; Start time = frame 480; Use button set definition
 Instance 9; Start time = frame 540; Use button set definition

*Fig. 23*

MENUS FOR AUDIOVISUAL CONTENT

The present invention relates to interactive menus and the like that are displayed and used for controlling playback of audiovisual content, for example stored on a DVD product.

In general terms, audiovisual content such as a movie or other presentation is formed by gathering together many small sections or clips of raw audio and visual content, which are typically referred to generically as "assets". The process of generating audiovisual content in this way is usually termed an "authoring" process wherein the raw sound clip and video clip assets are progressively assembled and edited together for use in the finished audiovisual product. The audiovisual product is then recorded on some form of recording media Traditionally, this would be an analogue medium such as celluloid film or analogue videotape (e.g. VHS format video tape), which typically plays back the product in a sequential manner from beginning to end. More recently, it has become possible to record audiovisual content onto random access media including in particular optical disk media such as a DVD-ROM, or other forms of random storage such as magnetic hard drives or electrically re-writable solid state memory, for example flash memory. These random access media have many advantages in terms of size, data capacity, playback speed, image quality and so on.

An optical disc is a convenient and relatively cheap storage medium for many different purposes. One kind of optical disc, a DVD-ROM disc, has been developed with a capacity of up to 4.7 Gb on a single-sided single-layer disc, and up to 17 Gb on a double-sided, double-layer disc. There are presently several different DVD-ROM application formats, including DVD-Video and DVD-Audio, amongst others. Of these formats, DVD-Video is particularly intended for use with pre-recorded audiovisual content, such as a motion picture, or 'movie'. As a result of the large storage capacity and ease of use, DVD-Video discs are becoming popular and commercially important. Conveniently, a DVD-Video disc is played using a dedicated playback device with relatively simple viewer controls, and DVD players for playing DVD-Video discs are becoming relatively widespread and cheap. More detailed background information concerning the DVD-Video specification is available from DVD Forum at www.dvdforum.org, and elsewhere.

Much of the following description herein uses examples based on the DVD-Video specification and DVD-Video discs in particular. For the sake of brevity of description, unless otherwise indicated or where context dictates otherwise, the term "DVD" alone will be used hereafter to mean a DVD-Video disc. Of course, broadly speaking and unless specifically stated, aspects and embodiments of the preset invention are not limited only to the DVD-Video specification and to DVD, since the principles taught can be far more widely applied, for example, to hard disc or solid state memory device storage. Indeed, the principles are likely to apply also to next generation optical disc technology, for example HD-DVD or Blu-ray, and, as such, aspects and embodiments of the present invention also apply thereto.

As well as providing significantly higher video and audio quality, the DVD-Video specification provides many additional features compared with the features that are associated with, for example, VHS format videotape. Specifically, among many new features, a DVD permits: up to eight soundtracks, to support multiple languages and supplemental audio, with each soundtrack being able to include surround sound channels; up to 32 subpicture tracks, which are, in effect, graphical overlays, for providing subtitles, captions and the like; up to nine different camera angles, which enables a viewer to switch between different viewpoints; and menus, which will be described in more detail below, which enable a viewer to select for playback particular combinations of the foregoing. These features are facilitated by the random access nature of a DVD.

Data is stored on a DVD as a multiplexed and interleaved data channel, which is read from the DVD as a data stream (or simply a 'stream'). This stream contains a video stream, an audio stream, a subpicture stream and a presentation control stream. The video stream typically comprises plural interleaved individual video streams, one for each camera angle (where plural angles are present). Likewise, the audio stream typically comprises plural interleaved individual audio track streams and the subpicture stream typically comprises interleaved individual subpicture streams. The program control information is provided in order to tell the DVD player (typically in response to viewer selection) which individual video, audio and subpicture streams to extract and replay and where physically on the DVD the respective data is stored.

In principle, DVD authoring is generally a linear procedure, which requires an author to gather together all of the assets required to generate a DVD presentation and encode the assets into a form suitable for DVD formatting and replication. For example, video content is typically encoded into an MPEG video stream, audio content may be encoded into a Dolby™ Digital audio stream and menus, subtitles and the like may be generated using a graphics design software package and then encoded into subpicture streams. Next, the various assets are generally linked together either by assigning timing information to the assets or by associating the assets with program control commands. For example, video streams may be linked to their respective audio streams using timing information and menus and audiovisual content may be linked by various link or jump instructions. Thereafter, a software compiler program is generally used to gather the assets together in accord with the linking information and convert them into a DVD-specification-compliant, multiplexed and interleaved data channel. In commercial scale production at least, the data may be written to a storage medium, for example a linear tape, in a formatting or pre-mastering step, which is then used in a mastering process to generate a DVD master. The DVD master is typically then used in a manufacturing process to stamp final reproduction DVD discs.

Due to the relatively large number of assets that may need to be gathered together and linked for a single DVD product, DVD authoring may be extremely time consuming, complex and error-prone. Typically, creating and gathering the assets and then linking them together is a labour-intensive exercise, which, for more complex titles containing many menus, can take of the order of several man months. One commercial authoring system, which can be used in this kind of authoring process, is Scenarist™, which is available from Sonic Solutions™ of Novato, Calif. (www.sonic.com). A more recent authoring system is DVD-EXTRA™ STUDIO, available from ZOOtech™ Limited (www.zoo-tech.com). Many other, mainstream, systems are available to home users, who wish to author home movies, photo albums or the like. Such systems include Power Director™3 by Cyberlink™, Pinnacle Studio™ 9 by Pinnacle™ and WinDVD Creator™ by InterVideo™. One advantage of using any of the available systems is that a user does not need to learn or understand in any depth the DVD-Video specification, which is extremely complex. This is because the systems typically provide an abstraction of the specification, which enables users to enter information in a higher-level syntax or language. The systems then, in effect, compile the user-inputted, higher-level information into a lower-level byte code form, which is the level understood by DVD players. The compilation process is similar to typical software generation, wherein a software programmer writes high level code in, for example, C, C++ or Java, and then uses a commercially available software compiler that converts the high level code into machine executable code, or machine code: a software programmer never needs to be able to understand and write machine code as such. The detailed description herein is written in terms that will be readily understood by the normally skilled person, who does not need an in depth understanding of the DVD-Video specification but who is familiar with DVD authoring and related authoring systems. If a reader is minded to learn about more specific features of the DVD-Video specification, he is referred to the extensive information available free of charge on the Internet, for example see http://dvd.sourceforge.net/dvdinfo/index.html, or one of the various text books on the subject, for example "DVD Demystified" by Jim Taylor, published by McGraw-Hill-Education, ISBN 0071350268.

It is known that a DVD typically has at least one menu, sometimes called the 'title menu' or 'top menu', from which a viewer usually has the option to at least play the main DVD content. The DVD-Video specification permits a DVD to have as many menus as is desired by the author of the DVD. Conversely, there may be no other menus. There is no facility in the specification to define a hierarchy of menus, as such. However, a de facto hierarchy can be generated by providing plural menus and defining the menus to have options to select other menus in any manner an author requires. For example, many commercially available films are produced on a DVD that has a top menu, including common options to 'play the film', 'select a language', 'select a chapter of the film' and 'set other playback options'. Each option of the top menu is typically associated with a respective sub-menu, and sub-menus may provide access to further sub-menus, and so on. An example of a three-tier menu hierarchy is illustrated in the diagram in FIG. 2, which will be described in more detail below.

DVD menus are populated by one or more menu buttons, or 'hot spots', which are defined as rectangular regions on screen that can be selected and activated. Menu buttons are visualised on screen using appropriate graphics, for example using subpictures or background content. Up to 36 buttons can be defined for a single menu using one subpicture stream. A menu button may be selected under program control or by navigating, or jumping, to the button under viewer control from within a current menu or from another menu. Typically, navigation from one button to another is achieved using the arrow keys (left, right, up, down) of a typical DVD player remote controller. Each menu button includes four directional links that determine which next button is selected when respective remote controller arrow keys are pressed. The links between buttons may or may not correspond to the physical arrangement of menu buttons on screen. In practice, directional links are typically not displayed and menu navigation between menu buttons is intended to be intuitive: for example, moving from one button to a button located, physically on screen, directly below is achieved by pressing the down arrow key of a respective remote controller. Each menu button can also have an associated command, which is selected by activating the menu button using the 'Select' (or 'Enter' or 'OK') key on the remote controller. Commonly, when a menu button is selected, or highlighted, its appearance changes according to a corresponding defined 'select state' of the button. For example, highlighting may be achieved by varying the respective subpicture pixel colour or intensity. Similarly, the button may be defined to change appearance momentarily after it is activated and before the respective command takes over.

Most commonly, menus are displayed independently of, for example before or after, normal audiovisual content playback. For example, a menu may present a viewer with playback options and selecting an option typically causes the menu to disappear and playback of specified audiovisual content, for example a film, to start or resume. It is, however, also possible, using subpictures, to superimpose a menu onto otherwise normal content during its playback. For example, use of such a feature is made in the DVD production "Austin Powers™ in Goldmember", ISBN 0-78064081-0. This DVD presentation provides a feature, implemented by infinifilm™, that causes a so-called 'pop-up' menu to appear, superimposed onto the main film during playback, whenever additional content relating to the main film can be viewed. In one instance, for around the first fifteen seconds of an early first scene of the film involving a stunt, a pop-up menu appears which, if selected by a viewer pressing the select key of the remote controller, causes playback to switch to a documentary describing how the stunt was filmed. When the documentary ends, playback of the film resumes from the beginning of the scene, generally where it left off. Many similar pop-up menus appear at different times throughout the film. The pop-up menus appear for between five and fifteen seconds at the beginning of scenes (or chapters) where the additional content is available. In this way it is trivial for the DVD player to resume from the departure point, by storing departure scene identity information, when the user accesses the pop-up menu, and resuming the film from the correct point using the stored scene identity information. The pop-up menus appear at pre-determined points in the film and cannot be accessed at other times by a user. It is perceived, however, that this feature provides a viewer with an improved interactive viewing experience, in which the viewer can control, to some extent at least, what they are viewing without stopping the film and navigating to a separate menu.

An alternative approach to providing a relatively more interactive viewer experience is employed in the British Broadcasting Corporation's DVD production of "Walking With Beasts", ©2001. In this documentary production, the main feature plays in a window, which forms an upper region of the overall viewable area of the screen. A permanent menu at the bottom of the screen provides options to switch playback between the "Main Feature", "Facts", supporting the main feature, "Evidence" supporting the Facts and "Making Of", providing-behind-the-scenes insights into the creation of the main presentation. At any time during playback a viewer can move seamlessly between these options using the menu and respective arrow key presses. The content for each playback option is authored to include both the audiovisual content and the menu option graphics. In other words, the basic menu graphics do not rely on subpictures. However, the menu options are highlighted during playback, as a result of viewer selection, using a subpicture. The content for each option is defined on the DVD as an alternative camera angle. In effect, when a viewer switches between the options, he is simply selecting a different camera angle, as far as the DVD player is concerned.

Use of interactive menus is also well-known in the field of computer software, which executes on a standard, programmable computer, for example running the Windows™ XP operating system. In such an environment, the computer typically has a relatively powerful processing capability and can generate new, complex graphics and menus on-the-fly, in response to appropriate software code instructions and environment context. In contrast, a DVD player has extremely limited means for generating new graphics at the time that the audiovisual product is played. Consequently, all possible menu images must typically be prepared in advance and recorded as part of the authoring of the audiovisual product. Unfortunately, this leads to a relatively lengthy and complex authoring process, which provides a significant technical and commercial barrier to the mainstream production of highly interactive DVD content.

In addition to using a dedicated DVD player to play a DVD, a DVD may be played using a DVD player apparatus, which forms part of a personal computer system, and appropriate DVD player emulation software, such as PowerDVD™ Version 3.0, by Cyberlink™ Corporation. Emulation software of this kind is well known. The software typically decodes the DVD content and replays it in a window of a computer screen. The physical controls (keys, buttons, etc.) that are typically associated with a dedicated DVD player are provided via a graphical user interface control panel, which may be accessed using a mouse or the keyboard of the personal computer. The arrow keys of a remote controller, which would be used to navigate menus and the like during DVD replay, may be replaced, in a software emulator, by arrow keys on the keyboard. The OK or Select key of a remote controller may be replaced by the Enter key on the keyboard. In addition, for example using PowerDVD, control options may be accessed at any time by pressing a right mouse button, when the respective on-screen pointer is positioned over the video playback window. The software responds by causing a pop-up menu to appear, options of which can be selected, again, using the mouse. The pop-up menu may be superimposed over video content, without interfering with playback, and provide options to Play, Stop, Pause, move to Next scene, move to Previous scene, change camera angle, change language, and configure the emulator software's playback options, among other options. Different emulation software may offer different options. These menus are not stored on the DVD as DVD content. Rather, such menus are generated on-the-fly by the emulation software, which is executing on the computer. As already described, the ability to generate menus on-the-fly in this way is a characteristic of a computer, which has powerful graphical processing capabilities.

An object of the present invention is to provide a viewer with an improved or at least alternative menu system, and an associated authoring method and system, which is available, for example, during playback of a DVD by a dedicated DVD player.

In particular, according to a first aspect, the present invention provides a method of authoring an audiovisual product, the method comprising the steps of: providing audiovisual content, generating at least a first menu and a second menu, each menu comprising at least one menu option, arranging the first menu to be displayed during playback of the audiovisual content and arranging a menu option of the first menu to cause display of the second menu during playback of the audiovisual content.

An audiovisual product in this sense is distinct from software of the kind that executes, and can generate menus on the fly, on a computer system. Thus, a menu structure may be provided, wherein one menu can be used to display another menu during playback of the audiovisual content, for example a main movie presentation. While prior products have been able to generate a menu with at least one menu option during playback of audiovisual content, selecting any such option has caused a change in playback behaviour of the product. For example, the option has caused playback of a different angle or different content entirely.

More particularly, the method may comprise the steps of: generating at least one first-level menu comprising at least one menu option and at least two second-level menus, each second-level menu comprising at least one menu option that is different from the menu option or all menu options of the or each other second-level menu; arranging the at least one first-level menu to be displayed during one or more portions of the playback of the audiovisual content and arranging a menu option of the or each first-level menu to cause display of a different second-level menu at different times during the playback of the audiovisual content.

For example, the same first-level menu may be arranged to cause display of different second-level menus at different times during playback. Alternatively, different first-level menus may be arranged to cause display of different second-level menus at different times during playback.

The method may comprise the step of generating one or more additional menus, each having at least one menu option, and arranging an additional menu to be displayed by a menu option of the first, second or another additional menu during playback of the audiovisual content.

In this way, embodiments of the present invention permit a menu structure to provide plural options, any one or more of which can display another menu or enact an alternative process. For example, a main menu may be used to access sub-menus or the like during playback of audiovisual content.

The method may comprise the step of defining a menu hierarchy, comprising plural menus, wherein a menu that is higher in the hierarchy has an option to cause display of a menu that is lower in the hierarchy during playback of the audiovisual content.

Conveniently, in this manner, it is possible to generate a hierarchical menu structure that can be displayed during playback of a main movie presentation. In other words, embodiments of the present invention provide a means for generating a menu structure that can be accessed without disturbing playback of, for example, a main movie presentation.

The method may comprise the step of providing a menu that is lower in the hierarchy with a menu option to display a menu that is higher in the hierarchy.

In this way, it is possible to move back and forth in the menu hierarchy during playback of the audiovisual content.

The method may comprise the step of providing a menu image for at least one menu.

Typically, a menu may be displayed as a number of menu options, which may be visualised by respective images, which a viewer can navigate between using, for example, the arrow keys of an appropriate remote controller.

Then, a menu that is displayed by a menu option of another menu is arranged to comprise an image, which includes an image representing both menus.

Conveniently, this provides the ability to generate an expandable menu hierarchy, whereby, for example, a menu that is higher in a hierarchy can be seen to expand when a menu that is lower in a hierarchy is selected.

The method may comprise the step of defining a cascaded menu hierarchy.

Accordingly, embodiments of the present invention facilitate a menu hierarchy of the kind associated more with software, for example Microsoft™ Word (e.g. by selecting the Tools menu, the Macro sub menu and the Record New Macro function), than with DVD playback.

The method may arrange at least one menu to partially or fully overlay the audiovisual content during playback thereof. For example, each menu may be arranged to partially or fully overlay the audiovisual content during playback thereof.

Indeed, the at least one, or each, menu may be arranged to fully overlay the audiovisual content during playback thereof.

In this way, a menu may, in effect, be superimposed on the viewable playback area during playback of audiovisual content. As such, there is no need to reduce the viewing area of the audiovisual content.

According to the method at least one menu option that causes the display of another menu may be arranged to be displayed transparently. For example, each menu option that causes the display of another menu may be arranged to be displayed transparently.

In addition, or alternatively, at least one menu option that causes the display of another menu may be arranged to be associated with a command that executes automatically on selection of that option.

In this way, one or more menu options may, in effect, be invisible. Advantageously, this feature may be used to hide menu options that contribute indirectly to an operation of a menu. For example, a visible menu option may provide access to an invisible menu option, which in turn causes a change in the menu structure. According to one embodiment of the present invention, which will be described in detail below, since a menu option on a DVD cannot execute a command as a result of a user pressing an arrow key of a remote controller, in order to make pressing an arrow key of the remote controller appear like executing a command, the embodiment defines the menu such that a particular arrow key press causes option selection to move to an invisible menu option, which automatically executes the desired command.

According to the method, each menu option that causes the display of another menu may be arranged to be associated with a command that executes automatically on selection of that option.

The method may be arrange so that at least the first menu is arranged to comprise plural menu options, wherein a first menu option is arranged to provide the user with a route to a second menu option, which is arranged to cause the display of another menu.

In particular, the first menu option may be provided with a route to the second menu option via a user activating or navigating away from the first menu option.

A user pressing an arrow key of a remote controller may, for example, cause such navigation.

Indeed, the first menu option may be arranged to be transparent.

In general, the or each menu option of the first menu may be arranged to be transparent.

This feature may be used conveniently to allow a user to select or activate a menu option that is not visible. In some embodiments, this may be used to display a menu in response to a user pressing an arrow key of a remote controller. This, in effect, is similar to a user displaying a menu by pressing a right mouse button during execution of some well-known software program.

The method may comprise the step of providing additional audiovisual content and at least one redirection menu option, which is arranged to redirect playback to that audiovisual content during playback of the first mentioned audiovisual content.

In addition, the method may comprise the step of providing means for storing information, on user selection of said redirection menu option, which identifies a point in the playback of the first mentioned audiovisual content that coincides with user selection of the redirection menu option.

Then the method may comprise the step of providing a means using said stored information, after playback of the additional audiovisual content has ceased, to resume playback of the first mentioned audiovisual content at or near the same said point. Accordingly, the method may then comprise the step of generating menu definition data for each menu. For example, the method may comprise, for each menu, the step of expanding the menu definition data into a sequence of individual instances, which are arranged to coincide, temporally at least, with a playback sequence of the audiovisual content.

The individual instances of the first menu or menus may be arranged into one or more addressable data streams and the individual instances of the second menu or menus may be arranged into one or more different addressable data streams. For example, an addressable data stream might be a subpicture stream in accord with the DVD-Video format.

There may be plural second menus and the individual instances of each second menu may be arranged into the same addressable data stream. For example, individual instances of the first menu or menus may include a menu option that switches to a display of the addressable data stream of the second menu or menus.

Alternatively, there may be plural second menus and the individual instances of each second menu may be arranged into different addressable data streams. For example, individual instances of the first menu or menus may include a menu option that switches to a display of one of the addressable data streams of the second menu or menus.

In any case, the individual instances of at least one menu may differ in displayed appearance. For example, the difference between instances may be arranged to change over time during playback of the audiovisual content. More specifically, the difference in appearance may be arranged to provide an animation effect.

In some embodiments, the difference in appearance is arranged to provide a timer. For example the timer might be a timer comprising increasing or decreasing numbers or a graphical image, such as a timer bar.

Preferably, then, the step of expanding is automated by using a computer program. The program may be executed (or executable) on a computer and include the steps of running an iterative loop to create, for each iteration of the iterative loop, at least one instance and associated timing information, which is defined according to a variable as adjusted for each iteration of the iterative loop, and adding each instance to the sequence according to its associated timing information.

According to a second aspect, the present invention provides an audiovisual product comprising audiovisual content and at least a first menu and a second menu, each menu comprising at least one menu option, the first menu being arranged to be displayed during playback of the audiovisual content and comprising a menu option to cause display of the second menu during playback of the audiovisual content.

According to a third aspect, the present invention provides an audiovisual product made using the foregoing method.

According to a further embodiment, the present invention provides an audiovisual content authoring system, which implements any of the aforementioned methods or processes.

Other aspects and embodiments of the present invention will become apparent from the following description, claims and drawings.

Embodiments of the present invention will now be described by way of example only with reference to the accompanying drawings, of which:

FIG. 16 is a timing diagram, showing the streams of data that are required to realise the hierarchical menu structure of FIG. 2;

FIG. 22 is a text file containing exemplary expanded menu instance information generated as a result executing the process of FIG. 21;

FIG. 23 is a text file containing exemplary expanded menu button instance information generated as a result executing the process of FIG. 21;

Figure 1:
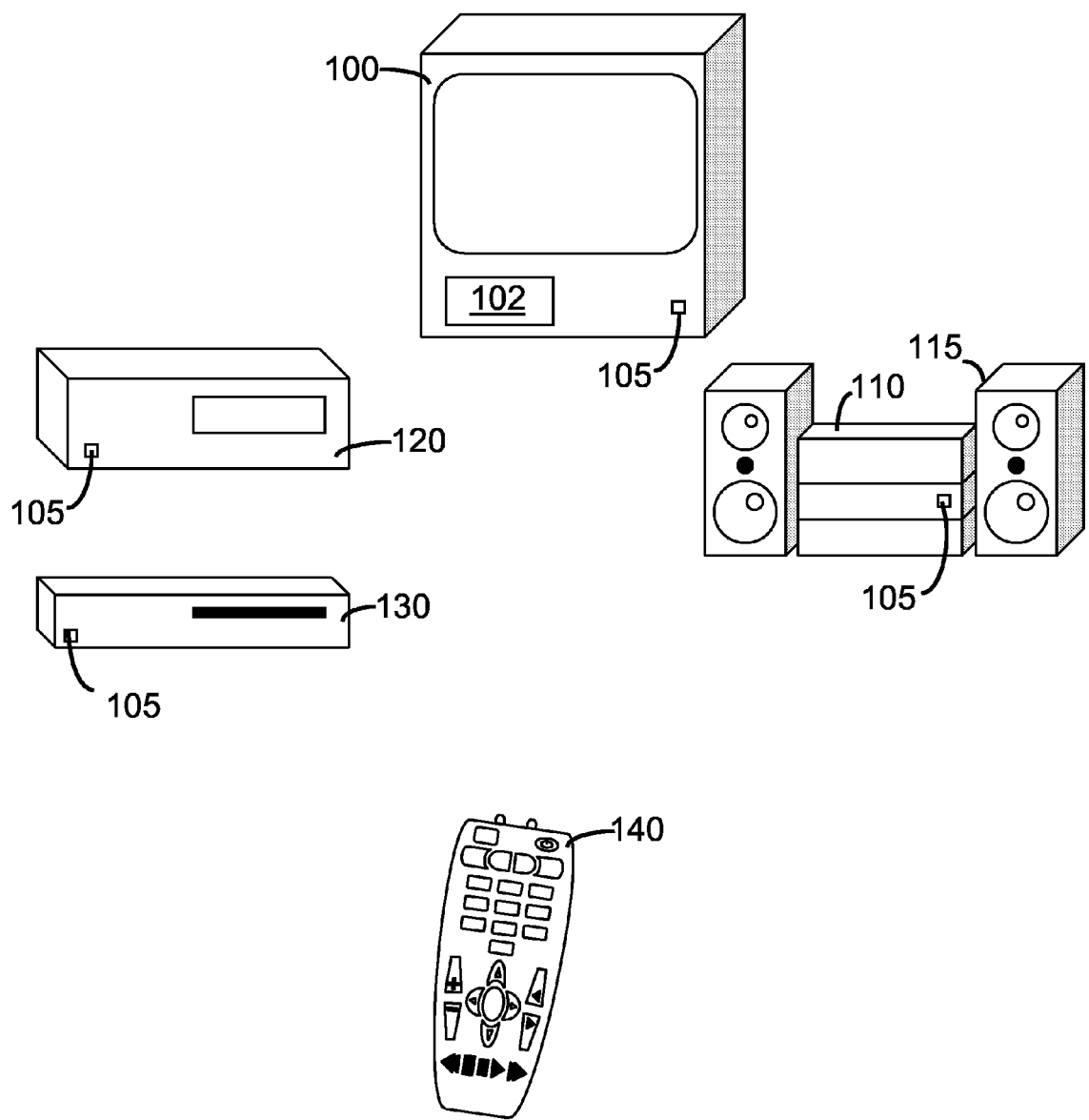
FIG. 1 is a diagram of a typical audiovisual system.

The diagram in FIG. 1 illustrates a typical home audiovisual system, which is suitable for playing a DVD according to some embodiments of the present invention. The system comprises components including a television 100, a stereo music player 110 with speakers 115, a videocassette player/recorder 120 and a DVD player 130 for playing the DVD. Each component is standard in the art and has an infrared detector 105 for receiving infrared signals from a respective remote controller 140, only one of which is shown.

Figure 2:
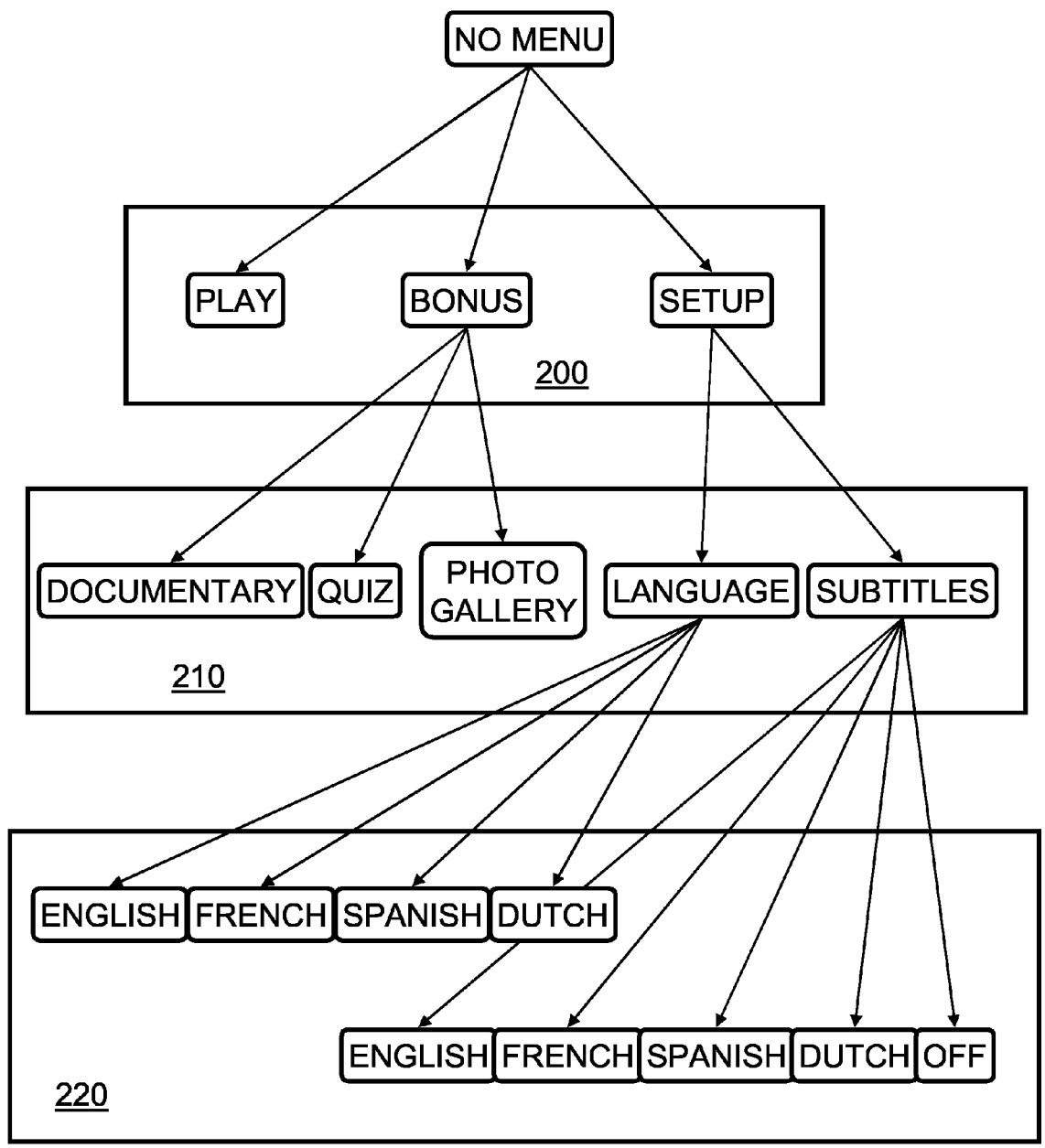
FIG. 2 is a graphic representation of a hierarchical menu structure.

FIG. 2 is a diagram, which illustrates an exemplary hierarchical menu structure, which will be used herein in order to demonstrate an embodiment of the present invention. The menu structure is hierarchical insofar as selecting an option of one menu can reveal further options in another menu, and (in this example) selecting one of those options can reveal further options in other menus, and so on. In this example, the menu hierarchy comprises three tiers: a first tier 200 comprising the three options of Play, Bonus and Setup; a second tier 210 comprising the three options of Documentary, Quiz and Photo Gallery, which are available by selecting Bonus in the first tier 200, and the two options Language and Subtitles, which are available by selecting Set-up in the first tier 200; and a third tier 220 comprising the four options of English, French, Spanish and Dutch, available by selecting Language in the second tier 210, and the five options of English, French, Spanish, Dutch and Off, available by selecting Subtitles in the second tier 210.

The hierarchical menu will now be described in the context of an exemplary practical environment, with reference to FIGS. 3 to 8.

Figure 3:
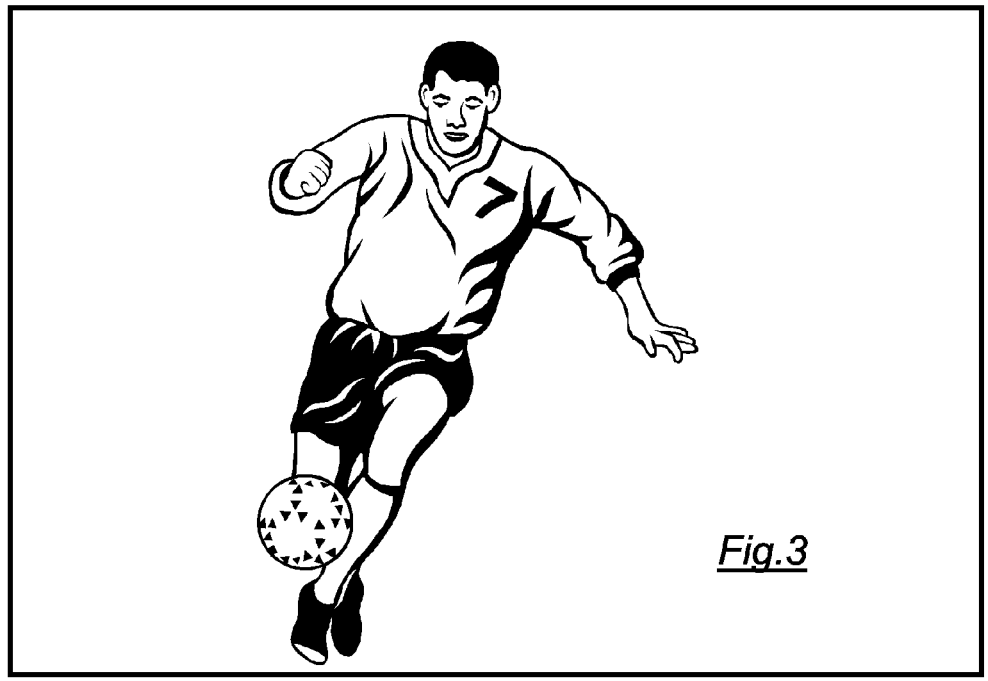
FIG. 3 is a diagram representing a display of audiovisual content.

FIG. 3 is a diagram, which represents the display, on the television 100, by the DVD player 130, of a movie or other DVD presentation. Although no menu is visible on the display, an 'Active' menu, comprising plural menu buttons, is present, as will be described in more detail hereinafter. FIGS. 4 to 8 are diagrams which represent the display by a viewer, who is controlling the DVD player 130 using the remote controller 140, of the exemplary hierarchical menu, which can be controlled to be progressively expandable and contractible according to an embodiment of the present invention.

Figure 4:
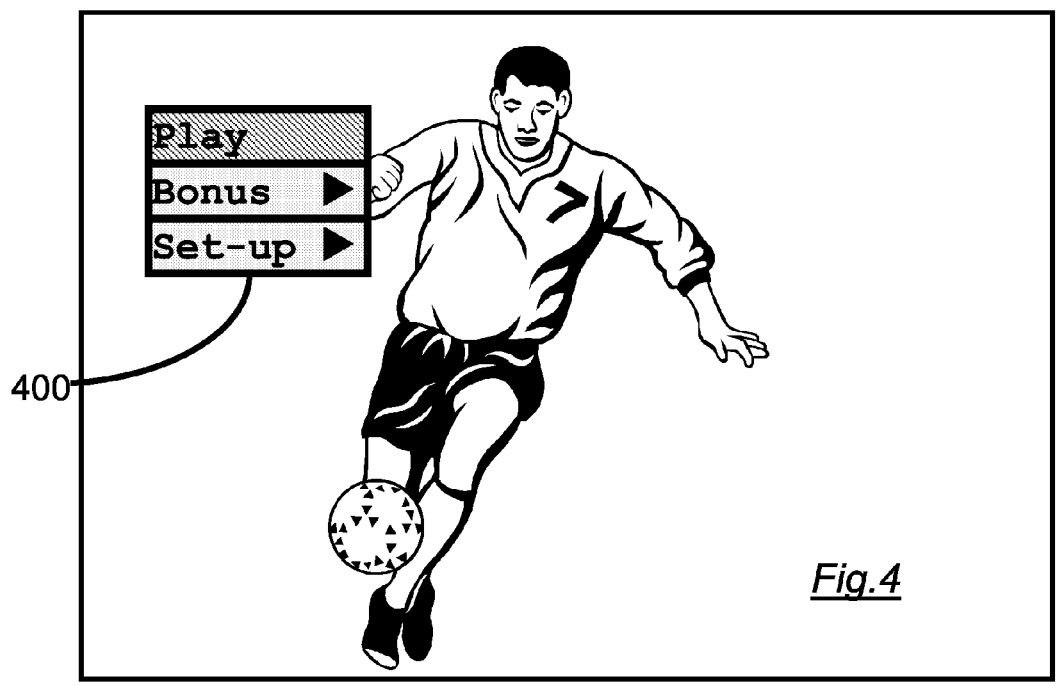
FIGS. 4 to 8 are further representations of the display of the audiovisual content of FIG. 3, and including a practical realisation of the hierarchical menu of FIG. 2.

In FIG. 4, in response to the viewer pressing the right arrow key of the remote controller 140, a first tier, 'Play', menu 400 of the menu hierarchy is displayed as a graphical overlay, superimposed on the movie content without disturbing the playback thereof. As shown, the menu includes the three options; 'Play', 'Bonus' and 'Set-up'. According to the diagram, the Play option is by default highlighted, indicating that it is the current selection, when the menu appears; selection being indicated in the diagram by shading of the option. Also apparent, in association with each of the Bonus and Set-up options, is a triangle symbol, '▶', which indicates that a second tier menu can be accessed from the respective options by pressing the right arrow key of the remote controller when the respective option is highlighted.

In operation, a viewer moves up and down between the three options by using the up and down arrow keys of the remote controller 140 in the normal manner.

Figure 5:
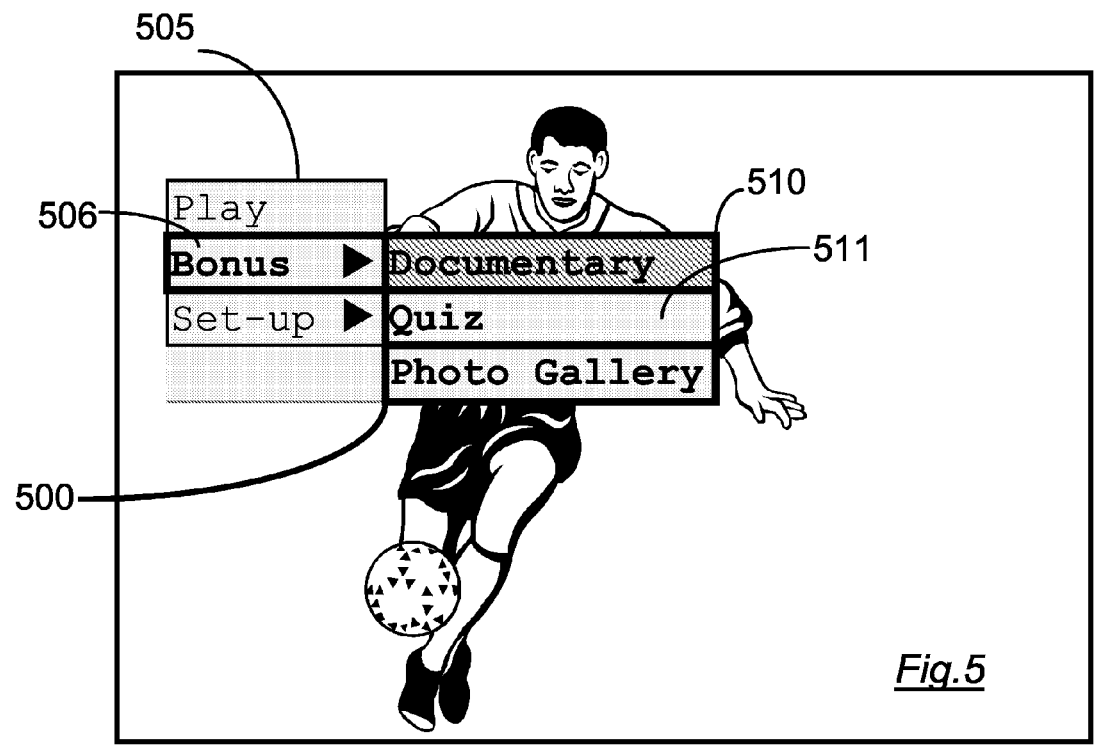

If the viewer selects the Bonus button of the Play menu 400 and presses the right arrow key the menu expands by revealing a second tier, 'Bonus' menu 500, as illustrated in FIG. 5. The menu now comprises both an image of the Play menu 500 and, cascaded next to the Bonus option of the Play menu, the Bonus menu 500 of the menu hierarchy. In practice, from the viewer's perspective, the second tier Bonus menu 500 simply materialises next to the Play menu 400. The Bonus menu 500 provides the three further options; 'Documentary', 'Quiz' and 'Photo Gallery'. Initially, by default, the Documentary option is highlighted. The viewer can respectively select and activate any of these three options using the up, down and OK keys of the remote controller 140. For example, selecting the Documentary option may cause playback of the movie be replaced by playback of a documentary describing the making of the movie; selecting the Quiz option may cause movie playback to be replaced by a trivia quiz related to the movie; and selecting the Photo Gallery option may cause movie playback to be replaced by still photographs taken from scenes of the movie. The content for all these options resides in different areas of the DVD. In any event, each of the options provides a route to resume playback of the movie at the point where it was interrupted. Mechanisms for facilitating playback at the correct point are described in detail below.

Figure 6:
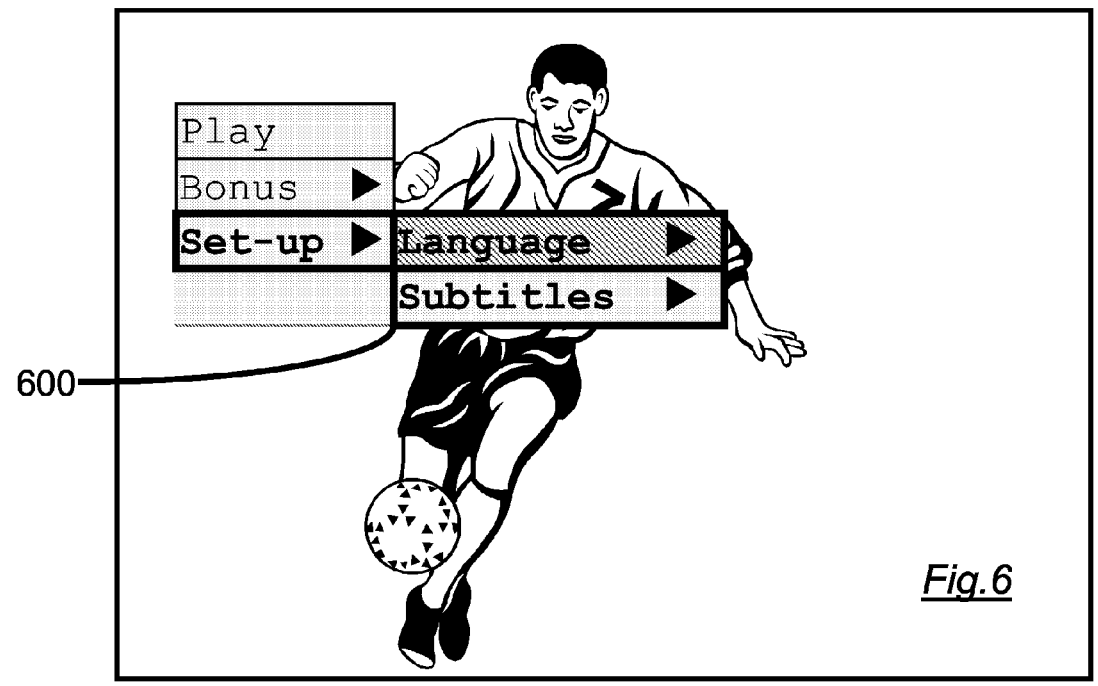

If the viewer selects the Set-up option from the Play menu 400 and then presses the right arrow key, the menu 400 expands by revealing a second tier, 'Set-up' menu 600, as illustrated in FIG. 6. The menu in this case comprises an image of the Play menu 600 and, cascaded next to the Set-up option of the Play menu, the Set-up menu 600 of the menu hierarchy. Again, from the viewer's perspective, the second tier Set-up menu 600 simply appears next to the Play menu 400. The Set-up menu 600 provides two options; 'Language' and 'Subtitles'. By default, the language option is highlighted. Each of the two options includes a triangle symbol, '▶', which indicates that a third tier menu of the hierarchy can be accessed from the respective options.

Figure 7:
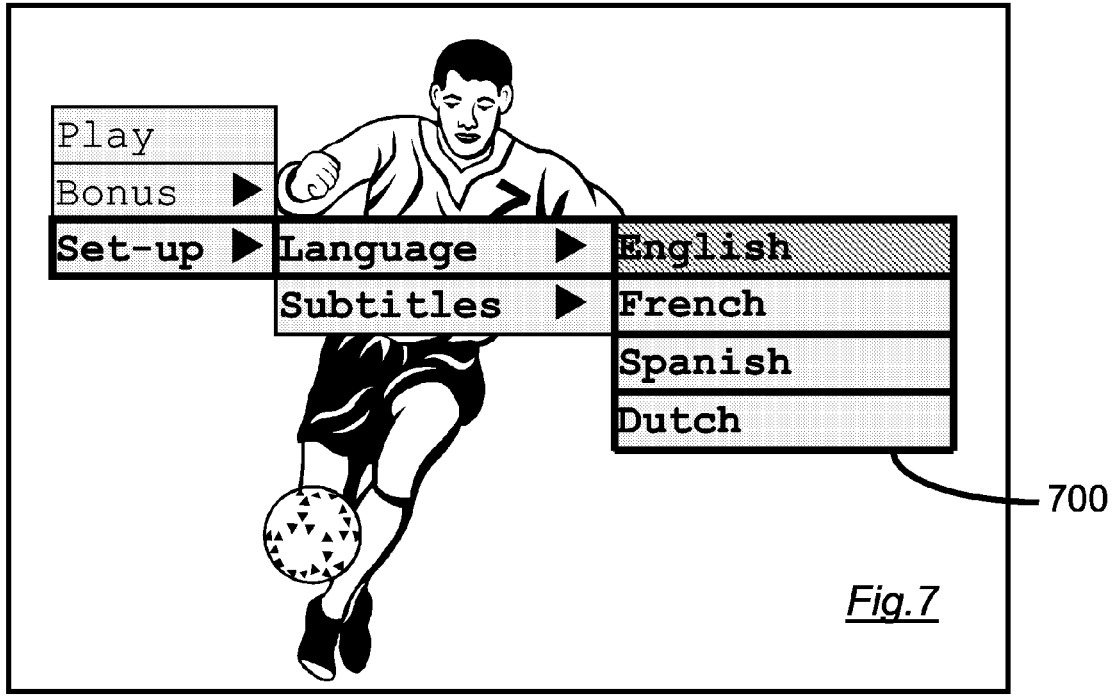

If the viewer selects the Language option from the Set-up menu 600 and then presses the right arrow key, the menu expands further by revealing a third tier, 'Language', menu 700, as illustrated in FIG. 7. The menu in this case comprise images of the Play menu 400 and the Set-up menu 600 and, cascaded next to the Language option of the Set-up menu 600, the Language menu 700 of the menu hierarchy. Again, from the viewer's perspective, the Language menu 700 simply materialises next to the Set-up menu 600. The Language menu 700 provides four language alternatives; English, French, Spanish and Dutch. Selecting of these language options, by pressing the OK key, causes the audio track of the movie to change, seamlessly, to the respective language. Once a language change has been chosen, the entire menu disappears.

Figure 8:
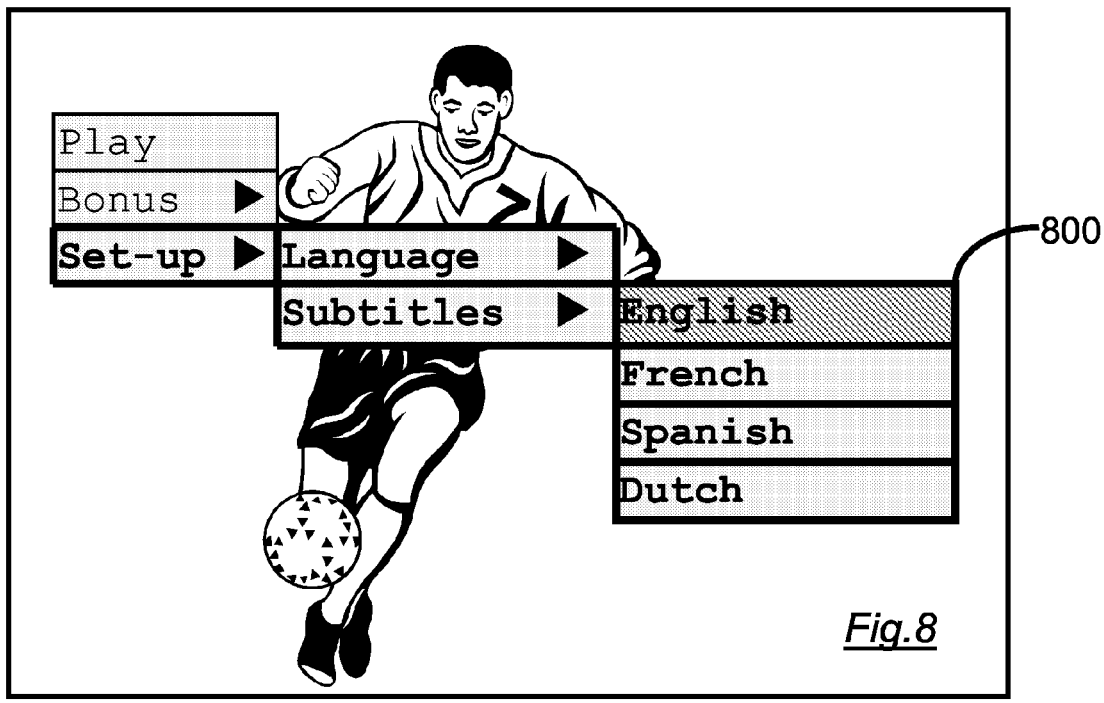

If the viewer selects the Subtitle option from the Set-up menu 600 and then presses the right arrow key, the menu expands by revealing a third tier, 'Subtitle', menu 800, as illustrated in FIG. 8. The menu in this case comprise images of the Play menu 400 and the Set-up menu 600 and, cascaded next to the Subtitle option of the Set-up menu 600, the Subtitle menu 700 of the menu hierarchy. Again, from the viewer's perspective, the Subtitle menu 800 simply materialises next to the Set-up menu 600. The Subtitle menu provides four language alternatives, English, French, Spanish and Dutch, and an 'Off' option, which is used to turn subtitles off. Selecting and activating any of the subtitle language options, by pressing the OK key, causes subtitles in that language to appear (not shown) as a graphical overlay at the bottom of the screen. Once a subtitle change has been activated, the entire menu disappears.

From any aforementioned second or third tier menu, a viewer can navigate back to a previous tier menu by pressing the left arrow key of the remote controller 140. This has the effect of (1) highlighting the option in the previous menu that had formerly initiated the display of the respective second or third tier menu and (2) causing the said second or third tier menu to disappear (or contract). The viewer can remove the menu in its entirety by navigating to the Play menu and pressing the left arrow key of the remote controller 140 in order to switch to the Active menu.

According to an exemplary embodiment of the present invention, the aforementioned expanding and contracting menu hierarchy is realised using subpictures as defined by the DVD-Video specification. With reference to FIGS. 3 to 8, it will be apparent that there are six different menu states, including the Active menu state of FIG. 3, which is defined by a first subpicture. In addition: the Play menu alone (FIG. 4) is a second state defined by one subpicture; the combination of the Play menu and the Bonus menu (FIG. 5) is a third state defined by a third subpicture; the combination of the Play menu and the Set-up menu (FIG. 6) is a fourth state defined by a fourth subpicture; the combination of the Play menu, the Set-up menu and the Language menu (FIG. 7) is a fifth state defined by a fifth subpicture; and the combination of the Play menu, the Set-up menu and the Subtitle menu (FIG. 8) is a sixth state defined by a sixth subpicture.

From this, it will be apparent that the appearance of generating progressively expanding menus in the aforementioned hierarchy is achieved by switching seamlessly between the various subpicture streams during movie playback. For example, selecting and revealing the Bonus menu next to the Play menu is achieved in this embodiment by switching from the second subpicture stream to the third subpicture stream. In this case, the image of the Play menu 400, which is included in the third subpicture stream, simply replaces the Play menu image in the second subpicture stream. This gives the viewer the impression that the Play menu part of the overall menu has not altered and that the Bonus menu has simply been added. Likewise, pressing the left arrow key when only the Play menu 400 is displayed has the effect of removing the menu from screen entirely by switching from the second subpicture stream to the first subpicture stream, which contains no menu image.

As is already known in the DVD authoring art, a menu may be represented by a subpicture and a selected option of the menu may be identified by being highlighted using respective menu buttons, which form a part of the subpicture. As already indicated, menu buttons are given the appearance of being selected and activated by manipulating the respective pixel values of the subpicture.

The diagrams in FIGS. 9 to 14 each illustrate a part of a menu button set that corresponds to the respective menu subpictures of FIGS. 3 to 8 respectively.

Figure 9:
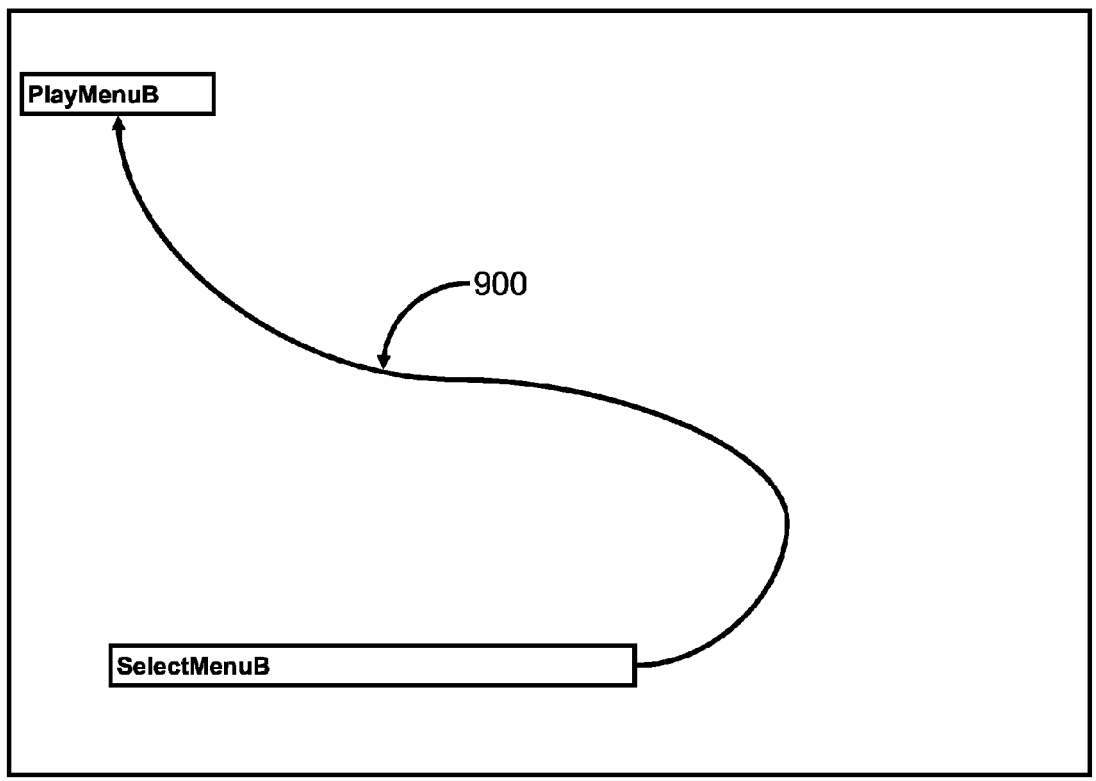
FIGS. 9 to 14 are graphic representations of menus buttons associated with the displays of menus of FIGS. 4 to 8 respectively.

In FIG. 9, there are two buttons shown associated with the Active menu of FIG. 3, in which there are no menu options, but viewer interaction is possible. The buttons include a 'SelectMenuB' button, which is by default selected and is defined so that the selection moves to the PlayMenuB button in response to viewer pressing the right arrow or Enter key of the remote controller 140. Both buttons can be located physically anywhere on screen since they never become visible to a viewer. In an alternative embodiment, SelectMenuB may be visible and comprise a message, such as "Press OK to display the menu", whenever that menu is available. The advantage of this latter approach is that a user knows how to access the menu. However, such a message may also detract from the content that is being played back. In any event, the result of pressing the right arrow key of the remote controller is represented in FIG. 9 as an arrow symbol 900 originating from the right hand side of SelectMenuB and pointing to PlayMenuB. A similar arrow representation to indicate moves between buttons using left and right key presses will be used hereafter. Up and down arrow key presses are not illustrated in this manner in the diagrams, although it will be understood that up and down arrow key presses are defined for each of the menu buttons. PlayMenuB is defined as a so-called 'auto-action' button, which executes its command automatically as soon as it is selected; without the need for a viewer to press the OK key of a remote controller. The PlayMenuB command switches to the subpicture stream that is associated with the Play menu 400, as shown in FIG. 4.

Figure 10:
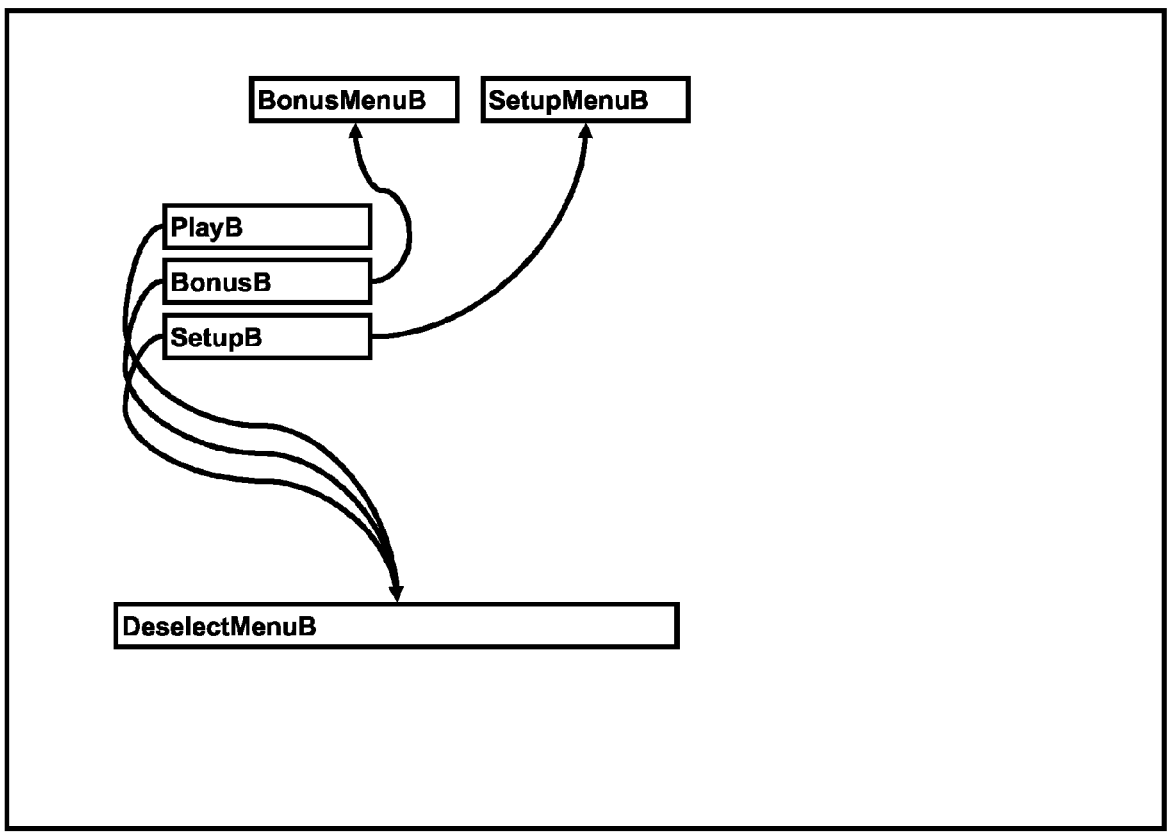

The diagram in FIG. 10, shows the buttons that are associated with the Play menu 400. Five buttons are shown, designated as 'BonusMenuB', 'SetupMenuB', 'PlayB', 'BonusB', 'SetupB' and 'DeselectMenuB'. BonusMenuB, SetupMenuB and DeselectMenuB, which can be located physically anywhere on screen since they never become visible to a viewer, are auto-action buttons. BonusMenuB causes display of the subpicture associated with the Bonus menu 500; SetupMenuB causes display of the Set-up menu 600 subpicture and DeselectMenuB causes the menu to disappear from the screen by switching to the subpicture associated with the Active menu. PlayB, BonusB and SetupB correspond in location, physically on screen, with the respective Play menu options. Selecting and activating PlayB causes the movie to restart from its beginning. The other two buttons have respective left and right arrow key press responses as illustrated by the accompanying arrow symbols. Specifically, pressing the right arrow key from BonusB causes selection of BonusMenuB, which in turn automatically switches to the Bonus menu subpicture stream (comprising images of both the Play menu and the Bonus menu). Likewise, pressing the right arrow key from SetupB causes selection of SetupMenuB, which in turn automatically switches to the Setup menu subpicture stream (comprising images of the Play menu and the Set-up menu).

In principle, according to the DVD-Video specification, pressing an arrow key simply causes button selection to move from a currently selected button to another button, insofar as the currently selected button has such a movement defined. In particular, according to the present embodiment, pressing the right arrow key while, for example, the BonusB button is highlighted, can only cause another button to be selected. In other words, a right arrow key press alone cannot 'directly' execute a command to display the Bonus menu 600. Therefore, in order to cause display of the Bonus menu 600, for example, the present embodiment defines the aforementioned auto-action button, BonusMenuB, which does not appear to the viewer, in order to provide the requisite, auto-executing command, which displays the respective subpicture. Such auto-action buttons are provided for expanding and contracting the menu hierarchy. To a viewer, it is not apparent that menu button selection is being redirected via auto-action buttons in this manner, since the auto-action buttons do not appear visible to the viewer.

Movement between menus in the hierarchy could instead (or in addition) be achieved by defining the respective menu buttons to have a command, which directly causes display of the respective subpicture. In this case, a viewer could move between menus in the hierarchy by 'activating' the respective menu button, by pressing the OK key of the remote controller, thereby obviating the auto-action buttons. The present inventors believe, however, that use of the arrow keys only to move between menus in a menu hierarchy is more intuitive for viewers, who may typically be familiar with expanding and contracting computer software menus (for example in Microsoft™ Windows™ applications). Of course, the menu could be defined so that both an arrow key press and use of the OK key moves between menus in the hierarchy, in order to satisfy the intuition of most potential viewers.

With reference to FIG. 10, pressing the left arrow key when any one of PlayB, BonusB and SetupB is selected moves the selection to DeselectMenuB, which automatically switches to the subpicture stream associated with the Active menu.

Figure 11:
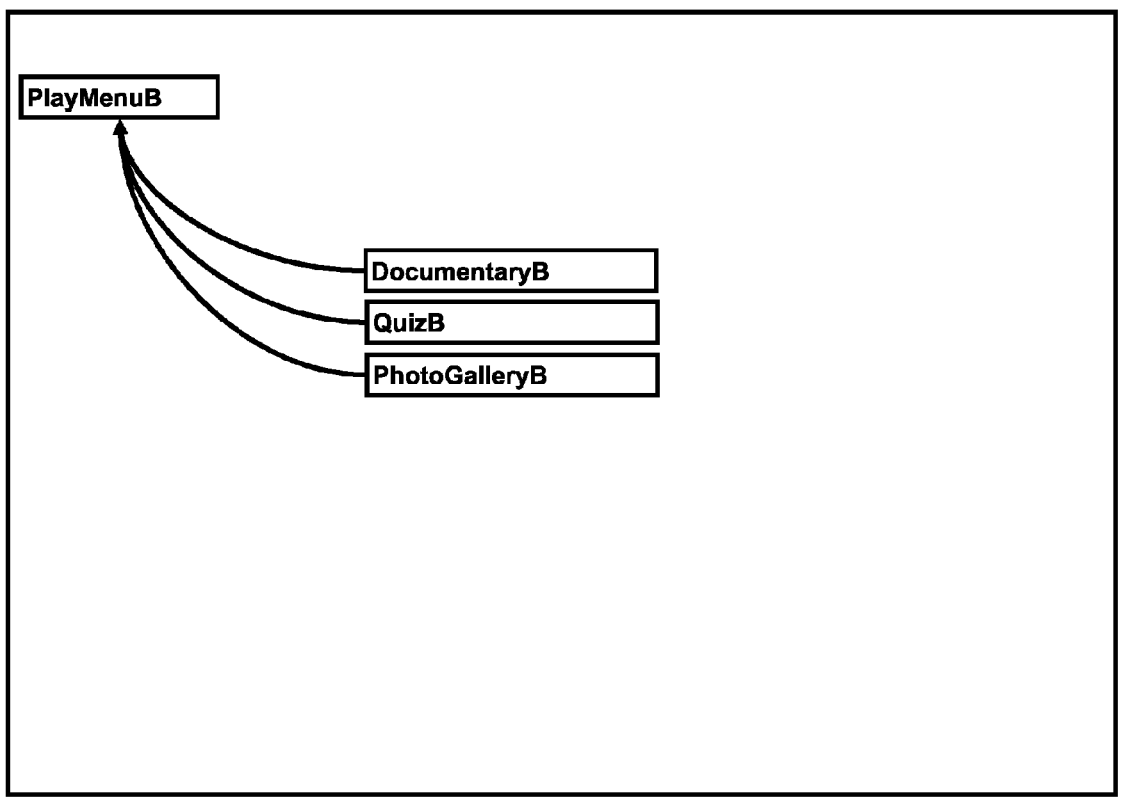

The diagram in FIG. 11 shows the menu buttons that are associated with the Bonus menu of FIG. 5. The Bonus menu 500 appears as a result of pressing the right arrow key when BonusB, the Bonus menu option from the Play menu 400, is highlighted. BonusB selects BonusMenuB causing automatic display of the Bonus menu subpicture. The Bonus menu 500 is associated with four buttons; 'PlayMenuB', 'DocumentaryB', 'QuizB' and 'PhotoGalleryB'. PlayMenuB is selected in response to a left arrow key press when any of the Bonus menu options are highlighted. PlayMenuB is an invisible, auto-action button, which automatically causes display of the Play menu subpicture, providing the appearance of moving back up, or contracting, the menu hierarchy. The remaining three buttons, which correspond logically and physically on screen with the respective menu options, behave, when activated, according to the description accompanying FIG. 5. For example, DocumentaryB can be activated to cause playback of a documentary.

Figure 12:
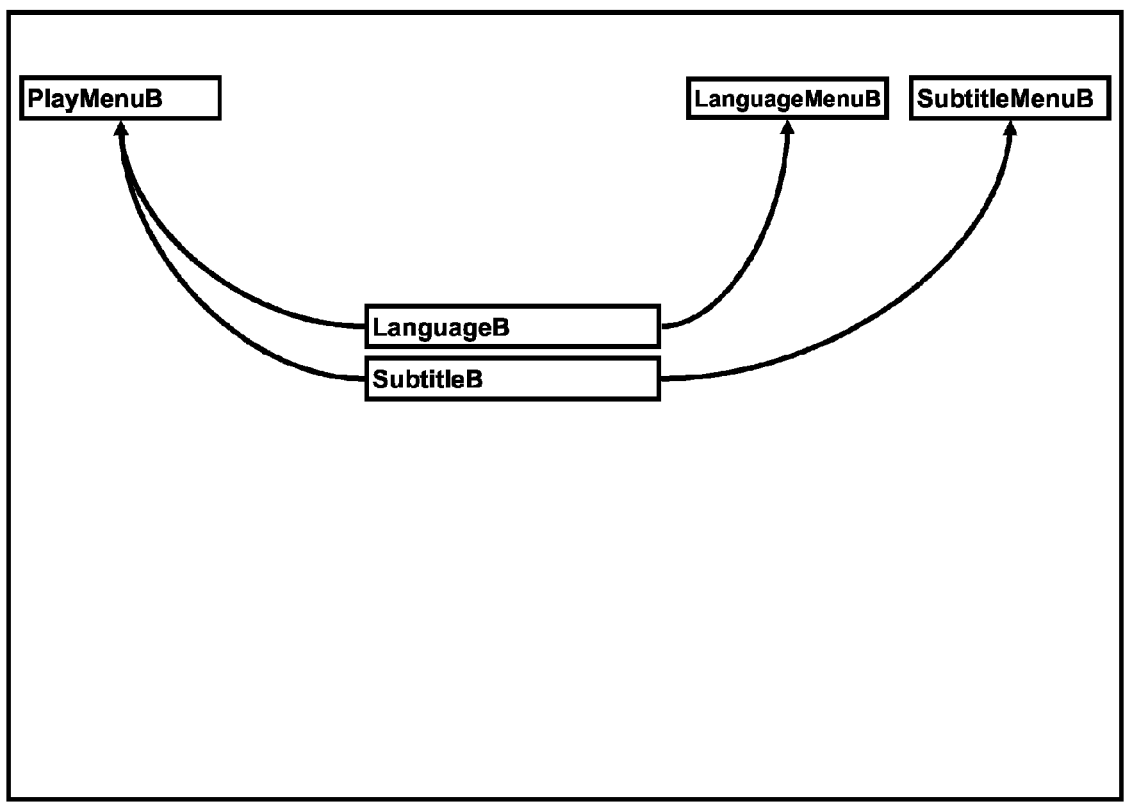

The diagram in FIG. 12 shows the menu buttons that are associated with the Set-up menu 600 of FIG. 6. The Set-up menu appears as a result of pressing the right arrow key when SetupB, the Setup menu option from the Play menu 400, is highlighted. SetupB selects SetupMenuB causing display of the Set-up menu subpicture. The Set-up menu is associated with five buttons: PlayMenuB (which behaves as in the Bonus menu), 'LanguageMenuB', 'SubtitleMenuB', 'LanugageB' and 'SubtitleB'. LanguageMenuB and SubtitleMenuB are invisible, auto-action buttons which, when selected, automatically display their respective menu subpictures. LanguageB and SubtitleB are buttons that correspond logically and physically on screen to their respective Set-up menu options, as shown in FIG. 6.

Figure 13:
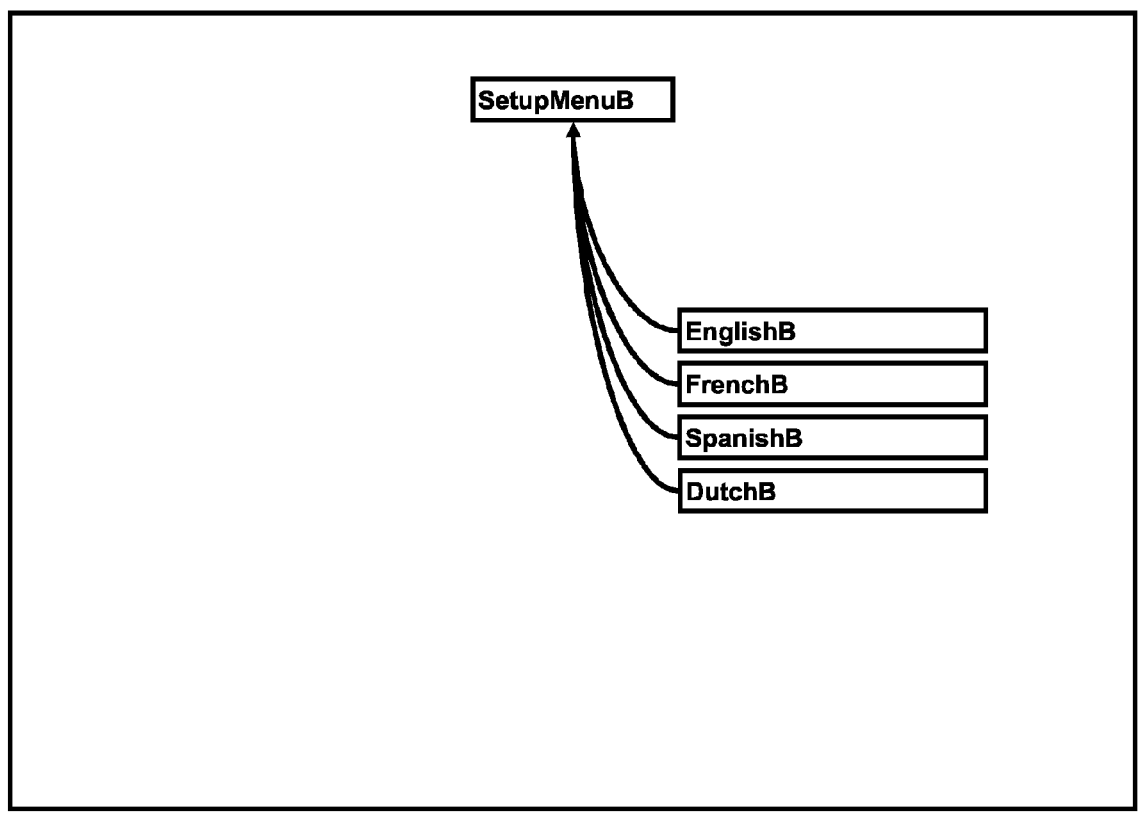

The diagram in FIG. 13 shows the menu buttons that are associated with the Language menu 700 of FIG. 7. The Language menu 700 appears as a result of pressing the right arrow key when LanguageB, the Language menu option from the Set-up menu 600, is highlighted. LanguageB selects LanguageMenuB causing display of the Language menu subpicture. The Language menu is associated with five buttons; 'SetupMenuB', 'EnglishB', 'FrenchB', 'SpanishB' and 'DutchB'. SetupMenuB is an invisible, auto-action button which, when selected as a result of pressing the left arrow key when any of the other buttons is highlighted, automatically displays the Set-up menu subpicture, providing the appearance of moving back up the menu hierarchy. The remaining buttons are each associated with a command to change the audio stream to a different respective language.

Figure 14:
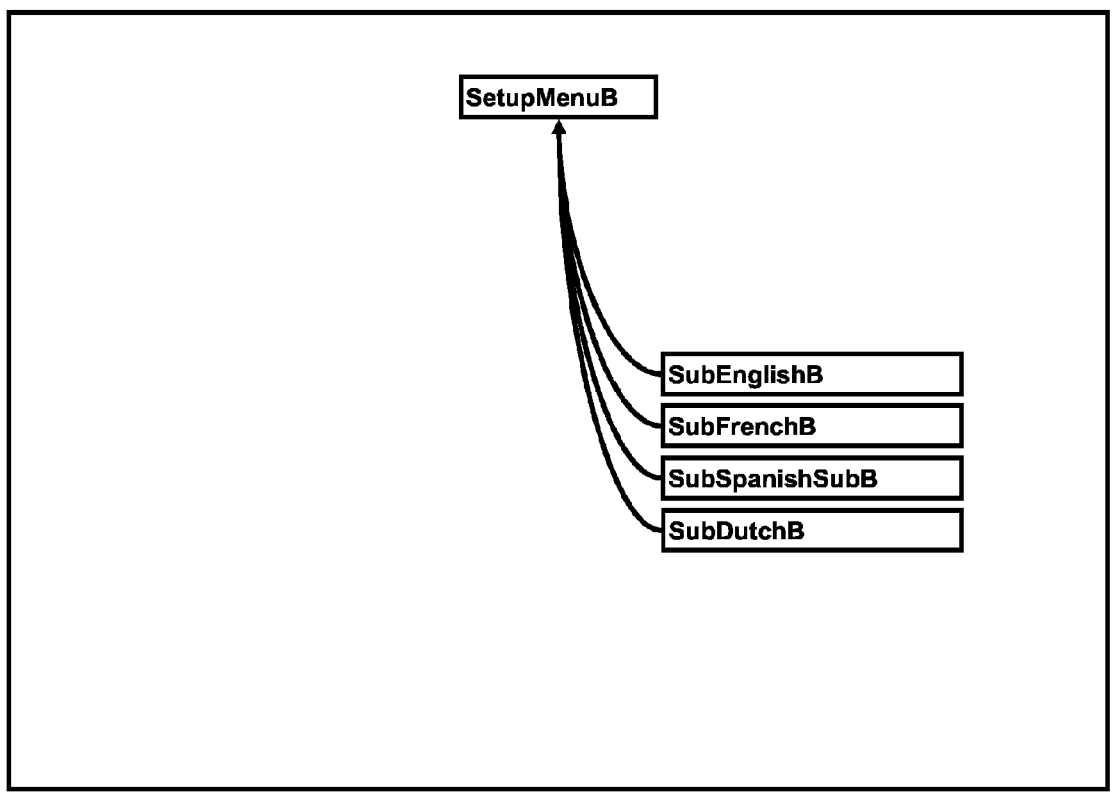

The diagram in FIG. 14 shows the menu buttons that are associated with the Subtitle menu 800 of FIG. 8. The Subtitle menu 800 appears as a result of pressing the right arrow key when SubtitleB, the Subtitle menu option from the Set-up menu 600, is highlighted. SubtitleB selects SubtitleMenuB causing display of the Subtitle menu subpicture. The Subtitle menu 800 is associated with five buttons; SetupMenuB (which behaves as in the Language menu), 'EnglishB', 'FrenchB', 'SpanishB' and 'DutchB'. These buttons (apart from SetupMenuB) are each associated with a command to cause display of a respective language subtitle subpicture.

It will be appreciated that only one of a menu subpicture and a subtitle subpicture can be displayed at any instant in time, according to the DVD-Video specification. As such, normally, if a subtitle language is selected and respective subtitles are displayed, the aforementioned hierarchical menu and its menu options would be removed. In order to avoid this situation arising, in accord with the present embodiment, it is desirable to define subtitle subpictures to include, in addition to subtitle text, at least the menu buttons that are described with reference to FIG. 9, relating to the Active menu. In this way, a viewer can activate the Play menu 400, by pressing the right arrow key, even when subtitles are being displayed. In other embodiments, defining each subtitle language stream to include the entire menu definition of the present hierarchical menu could extend this principle. Then, in effect, the viewer could switch on the hierarchical menu while still displaying (rather than replacing) the subtitle text. To achieve this, however, would require six sets of subpictures for each subtitle language; one set for each menu state. Since only 32 subpictures are available at any one time, the number of subtitle languages that could be supported in this way would be limited.

Figure 15:
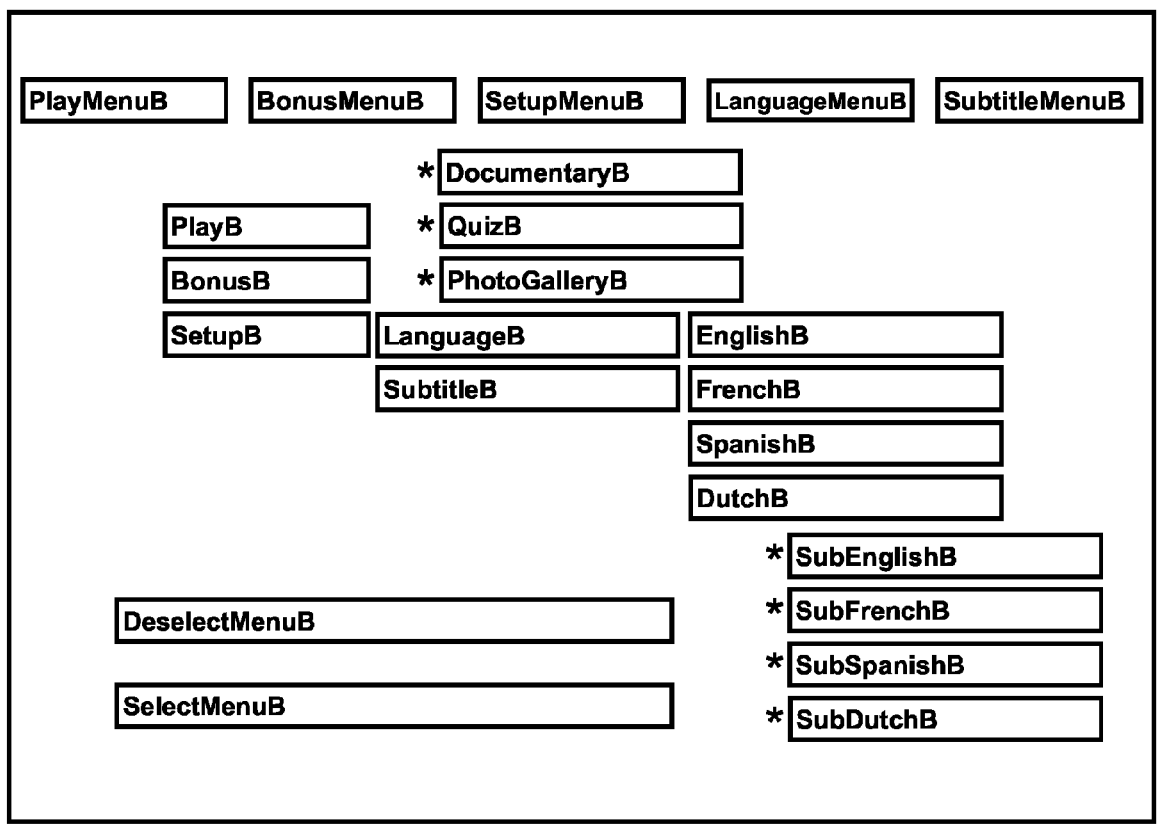
FIG. 15 is a diagram illustrating the entire menu button set of FIGS. 9 to 14.

For convenience only, the diagram in FIG. 15 shows all buttons in the button set, which have been described with reference to FIG. 9 to FIG. 14. Some of the buttons, marked with an asterisk "*" symbol, have been offset from their physical locations in order that all buttons can clearly be seen without overlap in the diagram. Each of the buttons is described in more detail below with reference to the table in FIG. 17.

It will be apparent from the foregoing description and drawings that the menu structure is defined by twenty-three menu buttons across six different subpictures, as illustrated in the timing diagram in FIG. 16, which will now be described in more detail.

The timing diagram in FIG. 16 illustrates in individual rows the various streams of data that make up DVD content, which defines the foregoing exemplary embodiment. The 'Timing' row at the top of the table indicates running time, in seconds, for the main playback content, 'Video'. Each stream is labelled in the left hand column. As shown, only a twenty second portion of the content is illustrated in the diagram. In principle, the presentation may be only a few seconds long or up to several hours long. In any case, the menu may be available during the entire presentation or only for a part or parts thereof.

With reference to the table in FIG. 16, in parallel with the Video stream, there are four audio streams (labelled Audio1 to Audio4), one for each of the available languages, and four subpicture streams (labelled Subpc1 to Subpc4), one for each of the available subtitle languages. The aforementioned eight streams are illustrated for the sake of completeness of description only, do not form part of the present invention and, as such, their content and structure will not be described in significant detail herein.

Next, there are seven subpicture streams (labelled Subpc5 to Subpc11). Subpc5, "No Menu", has no image or button definitions associated with it. This subpicture is used to, in effect, de-activate the menu structure, rendering the menu inaccessible. Subpc5 can be selected under program control only during playback of the DVD content, in playback intervals where no menu is intended to be accessible to the viewer.

The next six subpictures, labelled Subpc6 to Subpc11, correspond respectively to the menu configurations described above with reference to FIG. 3 to FIG. 8. Finally, accompanying the menu subpicture streams is a highlight stream (HGLT), which defines how the menu buttons in the menu button set are highlighted as they are displayed, selected and activated. The various buttons in the button set are defined according to the table shown in FIG. 17, which will be described in more detail below.

Figure 17:
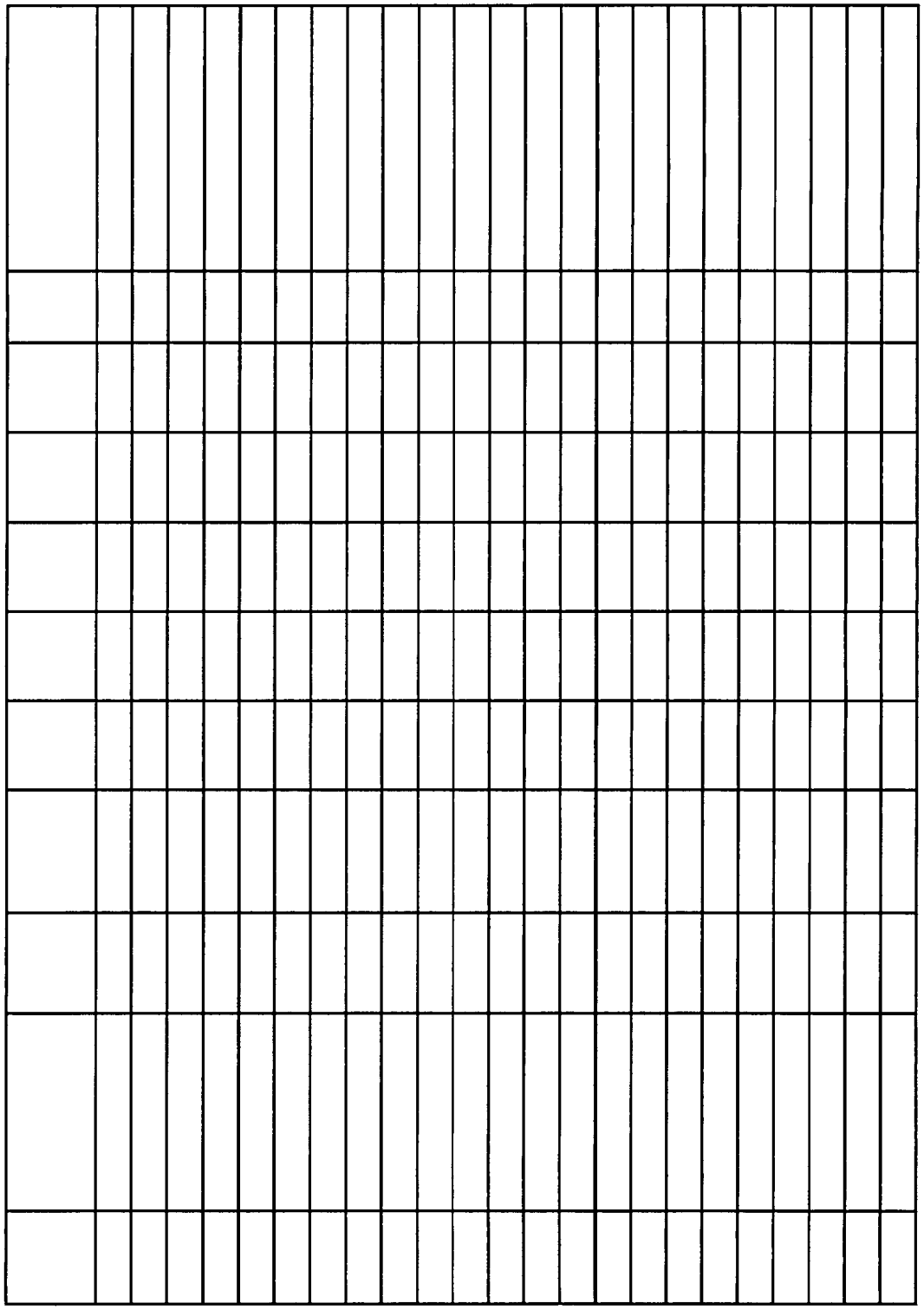
FIG. 17 is a table defining the menu button set of the hierarchical menu structure or FIG. 2.

According to the table in FIG. 17, the buttons of the button set described with reference to FIGS. 9 to 15 are labelled in the left hand column as Buttons 1 to 23. The respective button name, which corresponds to each button number, is included for convenience in the second column of the table. The third, fourth and fifth columns of the table indicate what states the buttons adopt during normal playback display: a "0" indicates transparency (that is, the button is invisible on screen), a "1" indicates normal intensity, a "2" indicates a relatively higher intensity (indicating button selection) and a "3" indicates a different colour (which is invoked momentarily after a visible button is activated). For example, PlayB, has a normal intensity (1) when displayed, a higher intensity (2) when selected and changes colour (3) when activated. In contrast BonusMenuB remains invisible at all times, denoted by a 0 in each of the three columns. The sixth, seventh, eighth and ninth columns indicate which button is selected (highlighted) next if a respective arrow key of the remote controller is pressed when a current button of a respective table row is highlighted. For example, pressing the down arrow key when Button 10 (QuizB) is highlighted moves the button selection to Button 11 (PhotoGalleryB). A "-" symbol in any of the foregoing four columns indicates that pressing the respective arrow key has no effect. The tenth column indicates whether a respective button is an auto-action button; "y" indicating that it is and "n" indicating that it is not. The eleventh and final column indicates the function of the command that is executed if the button is activated, either by pressing the OK key or automatically for an auto-action button. A "-" symbol in the eleventh column implies that the button has no defined command.

As shown in the timing diagram of FIG. 16, new instances of the seven subpictures that represent the menus (or no menu) are reproduced every two seconds in their respective subpicture streams. There is an important reason for this repetition insofar as the DVD-Video specification is concerned. Whenever a menu button command is executed, for example by highlighting the menu button and pressing the OK key, or by simply selecting an auto-action menu button, one side effect is that the respective menu disappears. In addition, another subpicture can only be displayed when a new instance of the subpicture appears in the DVD data stream. If there were only one instance of each menu subpicture, therefore, for example starting from the beginning of the Video stream, then the effect of attempting to navigate to a next tier menu, which requires invocation of a command to switch to a new subpicture, would effectively remove the menu structure from the display. Therefore, according to the present embodiment, whenever a right arrow key is pressed (or the OK key is pressed) in order to reveal a next tier menu, the next menu appears soon after at the start of the next instance of the respective menu subpicture. For example, assume that the Play menu 400 (Subpc7), as illustrated in FIG. 4, is displayed and the viewer highlights the Set-up button, SetupB, and presses the right arrow key of the remote controller 140 in order to display the Set-up menu 600 (Subpc9), as illustrated in FIG. 6. The result is that the button selection moves to SetupMenuB, which automatically executes a command to switch to the subpicture, Subpc9, in order to display the Set-up menu 600. Executing the auto-action command causes the Play menu 400 to disappear. If, say, SetupMenuB is activated slightly after five seconds (on the timing diagram), then the Set-up menu will be displayed when the timing reaches seven seconds, which coincides with the start of the next instance of the Set-up menu 600 in Subpc9. In other words, the maximum delay between one menu disappearing and another appearing is around two seconds.

Of course, it is possible to tune the delay before which a next menu appears by selecting an appropriate subpicture instance repetition rate in the stream. For example, increasing the subpicture instance repetition rate to one instance per second could reduce the delay, so that the maximum delay between one menu disappearing and a next tier menu appearing would be around one second. Likewise, the delay could be set to be longer than two seconds, by decreasing the repetition rate, in which case the maximum delay between one menu disappearing and a next tier menu appearing, would be commensurately longer. Ultimately, the repetition rate of the menu subpicture instances is a design parameter of the menu structure, and is not limited to being two seconds. The selection is a trade-off between an increased storage overhead, associated with an increased repetition rate, and a reduced viewer appeal, for a decreased repetition rate. The present inventors believe that two seconds is a reasonable compromise delay between menu screens.

Figure 18:
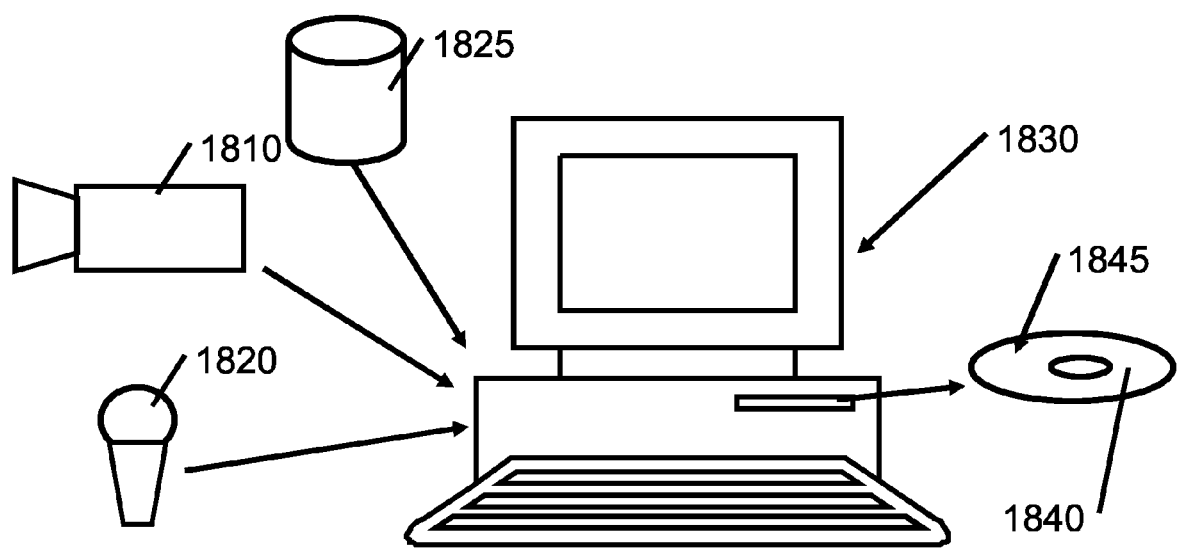
FIG. 18 is a diagram of apparatus suitable for authoring audiovisual content.

FIG. 18 shows an exemplary authoring apparatus as may be employed in preferred embodiments of the present invention. The authoring apparatus includes a computing platform such as a client-server computer system, or a stand-alone personal computer, 1830. Optionally, raw audio and video data are received, such as through a camera 1810 and a microphone 1820, or are provided from other sources such as a file storage device 1825, or are created within the authoring apparatus such as by image and sound capture and creation software. The raw content data may include video clips, audio clips, still picture images, icons, button images and other visual content to be presented onscreen. The content is suitably in the form of MPEG, JPEG or bitmap encoded files, but may take any suitable format.

Original audiovisual data can take any form such as a movie, or a company presentation, or a quiz game, amongst many other possibilities. The computer 1830 acting as the authoring apparatus creates the desired audiovisual product using the procedures that have been described herein. The computer 1830 writes the audiovisual product 1845 onto a storage medium such as a hard disk drive within the computer 1830 or onto an optical disk 1840.

Figure 19:
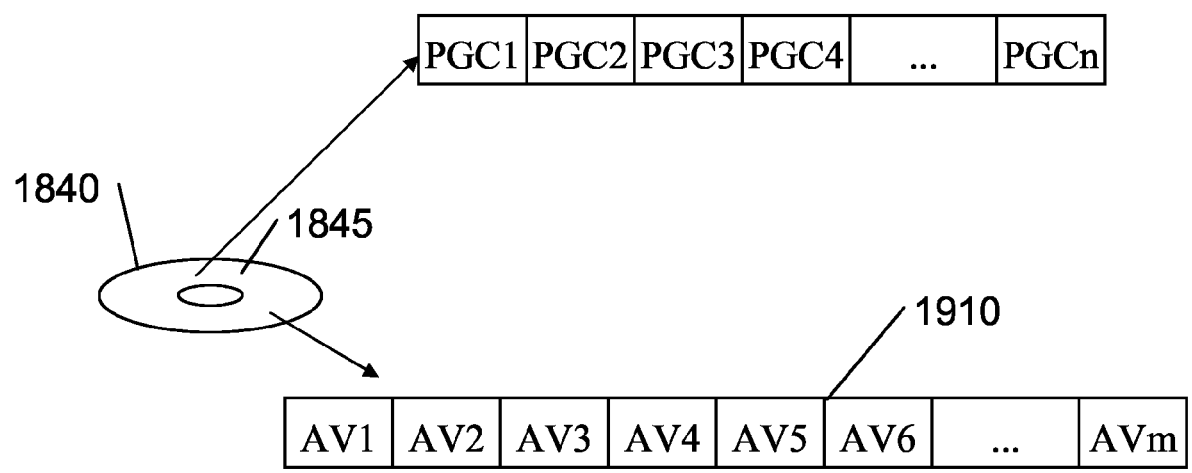
FIG. 19 is a diagram illustrating authored content, as stored on an optical disc.

FIG. 19 shows the general structure of the audiovisual product 1840 in more detail. The audiovisual product 1840 includes a plurality of cells 1910, in this case represented by cells AV1, AV2 . . . AVm. Each cell 1910 contains a short section of audiovisual data. The cells are played in sequence, typically one after the other, in order to deliver the intended audiovisual representation, under control of a playback sequence instruction 1920. The sequence instructions 1920 as shown in FIG. 19 are separate from the cells 1910. Suitably, the cells 1920 and the sequence instructions 1910 are each allocated to structure locations within the audiovisual product 1840, so as to enable navigation between instructions 1920 and from instructions 1920 to cells 1910.

In the preferred example of DVD-Video specification data, the cells 1910 are played in sequence through their inclusion by reference in programs (PGs), which are in turn organised into program chains (PGCs). In FIG. 19, the sequence instructions 1920 are represented by program phains PGC1, PGC2 . . . PGCn. Preferably, each cell 1910 contains at least one video stream, at least one audio stream, and/or at least one sub-picture stream. Menu information is included in subpicture streams, which are interleaved with the video and audio streams in the usual known way.

Figure 20:
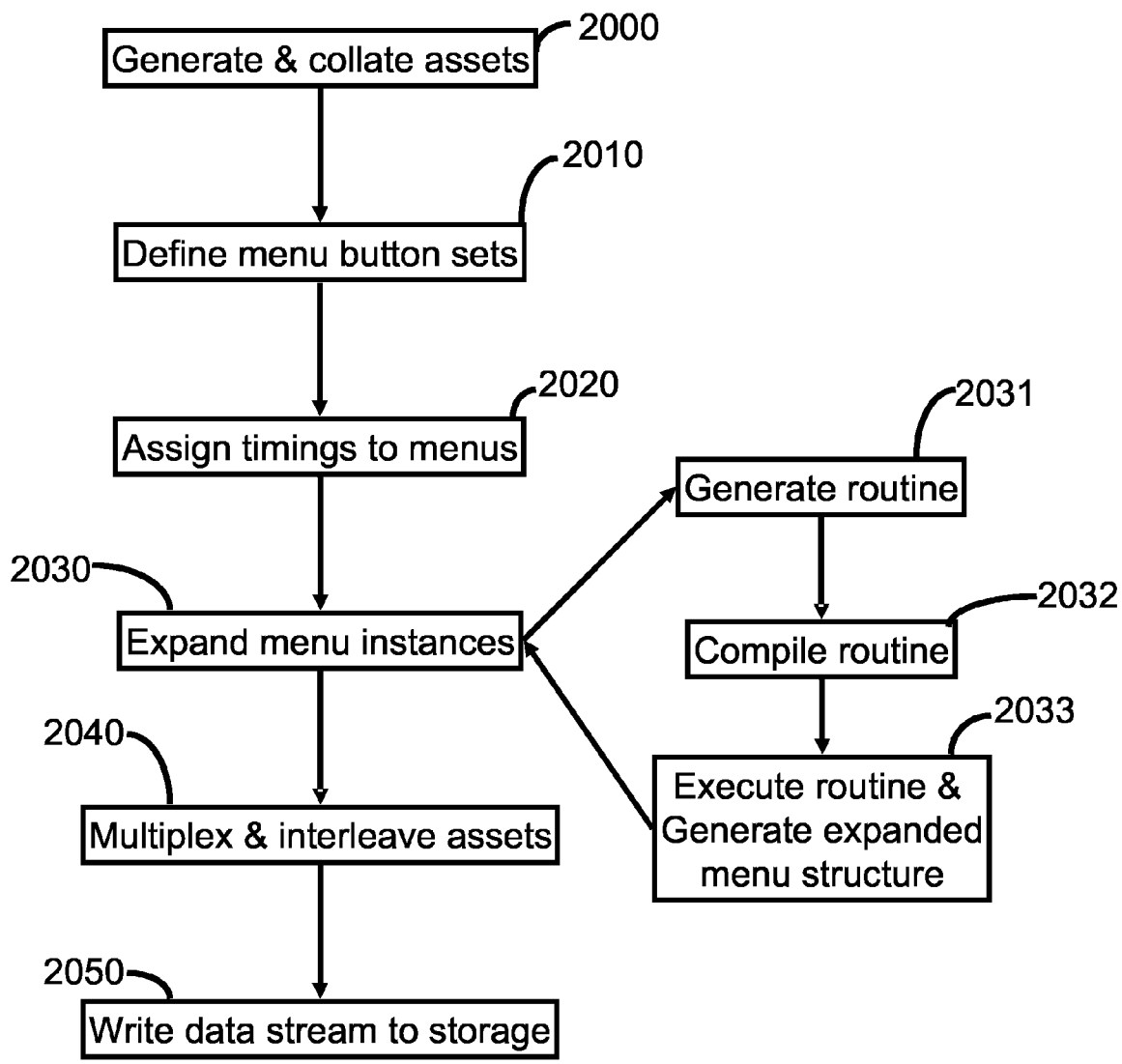
FIG. 20 is a flow diagram of a process of authoring audiovisual content comprising a hierarchical menu structure.

A method of authoring a hierarchical menu structure, of the kind described above, for use in association with a movie will now be described with reference to the flow chart in FIG. 20. In step 2000, an author generates, acquires and collates all the assets needed for the intended DVD and stores the assets on a hard disc storage device 1825. The assets include at least a video presentation, the accompanying audio streams and the images for the menu and subtitle subpictures. The subpicture images are typically generated using a software design package and stored as JPEG or bitmap graphics files. The graphics files represent the menus shown in FIGS. 4 to 8. In step 2010, the author defines the menu button set for the respective menus. The button set is defined in accord with the table in FIG. 17. In step 2020, timings are assigned to the menus. Timings relate to when the menus are available, for example for the entire video presentation or for one part or plural parts of the presentation. If there is a portion of the presentation in which there is no menu, then Subpc5 is selected under program control in order to, in effect, deactivate the menu.

In a next step, 2030, the menu structure is expanded into plural instances according both to the aforementioned timings and to a selected menu instance repetition rate, for example one instance per two seconds as in FIG. 16. The expansion step may be enacted manually, for example by creating a definition of each of the seven menu instances for each two-second block of time. For a twenty second timeframe, this requires 10×7=70 menu instance definitions. Of course, it is not inconceivable that a menu structure may be available during playback of a different DVD presentation that lasts for an hour or more. Such a presentation may have a menu structure requiring more than seven subpictures. For example, if a DVD presentation lasts an hour and ten subpictures are required to define the menu structure, this equates to a requirement to define 60×60/2×10=18000 menu instance definitions. Defining such a high number of menu instance definitions would be error-prone and laborious. Accordingly, the present exemplary authoring method automates the expanding step, as will now be described.

According to a first expanding step 2031, the author generates a software program or routine for automatically expanding the menu subpictures into plural menu instances. The routine is preferably written in a high-level, human-oriented programming language. In the preferred embodiment, this routine is created using JavaScript (JavaScript is a trade mark of Sun Microsystems Inc). JavaScript is a relatively simple and 'user-friendly' programming language, which has been developed primarily for use in creating HTML-based web pages. However, the inventors have found that JavaScript can also be used in other applications, and has benefits in environments other than HTML documents. One advantage of JavaScript is that it is relatively simple to learn, and has become relatively widespread. Also, by contrast with languages such as Java, C, C++ and others, JavaScript is a text-based scripting language that produces a textual output. However, other languages are suitable for use in the present invention, including VBScript or JScript, amongst others.

The routine includes at least one iterative loop, or similar functional looping structure. That is, the program will repeat one or more times any instructions contained within the loop, as appropriate. As a simple example, the loop is controlled by a variable such as the value "n", with the variable increasing in each iteration of the loop, such as 'for n equals from 1 to 10'.

In a second expanding step 2032, the author compiles the high-level routine for execution as machine code on the computing platform 1830. That is, depending on the implementation of the high-level language and the execution environment employed, it is usually necessary to compile the program in order that the program can be executed on the computing platform. In the event the routine is interpreted at runtime, rather than being pre-compiled, then this step may be omitted.

In a final expanding step, 2033, the author executes the high-level routine on the computing platform 1830. Executing the routine includes running the iterative loop. For each iteration of the loop, a textual representation of a new menu instance is automatically created.

Each menu instance is defined according to the variable (in this case "n") as adjusted for each iteration of the iterative loop. That is, in the first iteration, say n=1, the menu instance is defined appropriate to a value of n=1. In the second iteration then the menu instance is defined appropriate to n=2, and so on up to n=10. In this simple example, the loop control variable "n" is used to define a command operand. However, in most practical cases, other variables within the loop may be defined and adjusted.

The menu instances are added to an overall definition of the menu structure, for example as illustrated in the table in FIG. 16. In the preferred embodiment of the present invention, the menu structure is suitably defined as a textual document, or a text-based database, and held within a memory or disk storage of the personal computer 1830. The document preferably identifies, or makes reference to, menu subpicture images, which are typically pre-defined and stored in another storage location of personal computer 1830.

In a next step 2040 of the main process, an authoring software procedure automatically reads and interprets the textual document and multiplexes and then interleaves respective menu definitions with the other assets, for example video and audio assets, of the DVD content. The result is a multiplexed and interleaved sequence of bytecodes, which conforms to the DVD-Video specification. This step typically includes a step of importing into each menu instance the respective menu subpicture images, which are themselves then converted into bytecodes and placed as appropriate within the final multiplexed and interleaved sequence.

An exemplary software routine for implementing the expanding step is provided below in pseudo code form, where the text between each pair of "//" symbols provides a brief explanation of the accompanying lines of algorithm code:

```
Function ExpandMenuInstances
//This routine defines subpicture and highlight streams for a twenty second
portion of associated video content//
{
    MenuNameArray = ("NoMenu", "ActiveMenu",
    "PlayMenu", "BonusMenu", "SetupMenu",
    "LanguageMenu", "SubtitleMenu");
    //Define 'MenuName' as a one-dimensional array containing an entry,
    which corresponds to each of the seven menu subpictures //
    Define Outer Iterative Loop (Strm = 5 to 11 in
    steps of 1)
    //Define a first outer iterative loop, where the counter 'Strm'=5 to 11
    inclusive in steps of 1, to create a subpicture stream for each menu
    subpicture (Subpc5 to Subpc11)//
    {
        Define a new subpicture stream - 'SStream';
        Allocate the number 'Strm' to the new
        stream - 'SStream Strm';
        Define Inner Iterative Loop (i = 0 to < 20
        * 30 step 60)
        //Define an inner iterative loop, where the counter 'i' is used to
        create plural instances of each menu subpicture (where the 'step
        60' equates to 60 frames i.e. a two second period at thirty frames
        per second) for each subpicture stream; each instance therefore
        occurs 60 frames after the previous instance//
        {
            Create a menu instance i;
            Provide the instance with an image,
            having the path
            MenuNameArray[Strm]+"_sub.bmp";
            //That is, each menu stream uses a different menu image//
            Define a start time of the instance as
            the i-th frame;
        } //End of inner iterative loop//
    } //End of outer iterative loop//
    Define a new highlight stream;
    Define Iterative Loop (i = 0 to < 20 * 30 step
    60)
    //Define a second outer iterative loop, where this time the counter 'i' is
    used to create plural instances of the menu button set definition, stored
    as a highlight stream. There is one highlight stream instance for each
    menu instance//
    {
        Create a highlight stream instance -
        'HStream';
        Associate the instance with a pre-defined
        menu button set ("ButtonSet");
        Define a start time of the instance as the
        i-th frame;
    } //End of second outer iterative loop//
} //End of routine //
```

Figure 21:
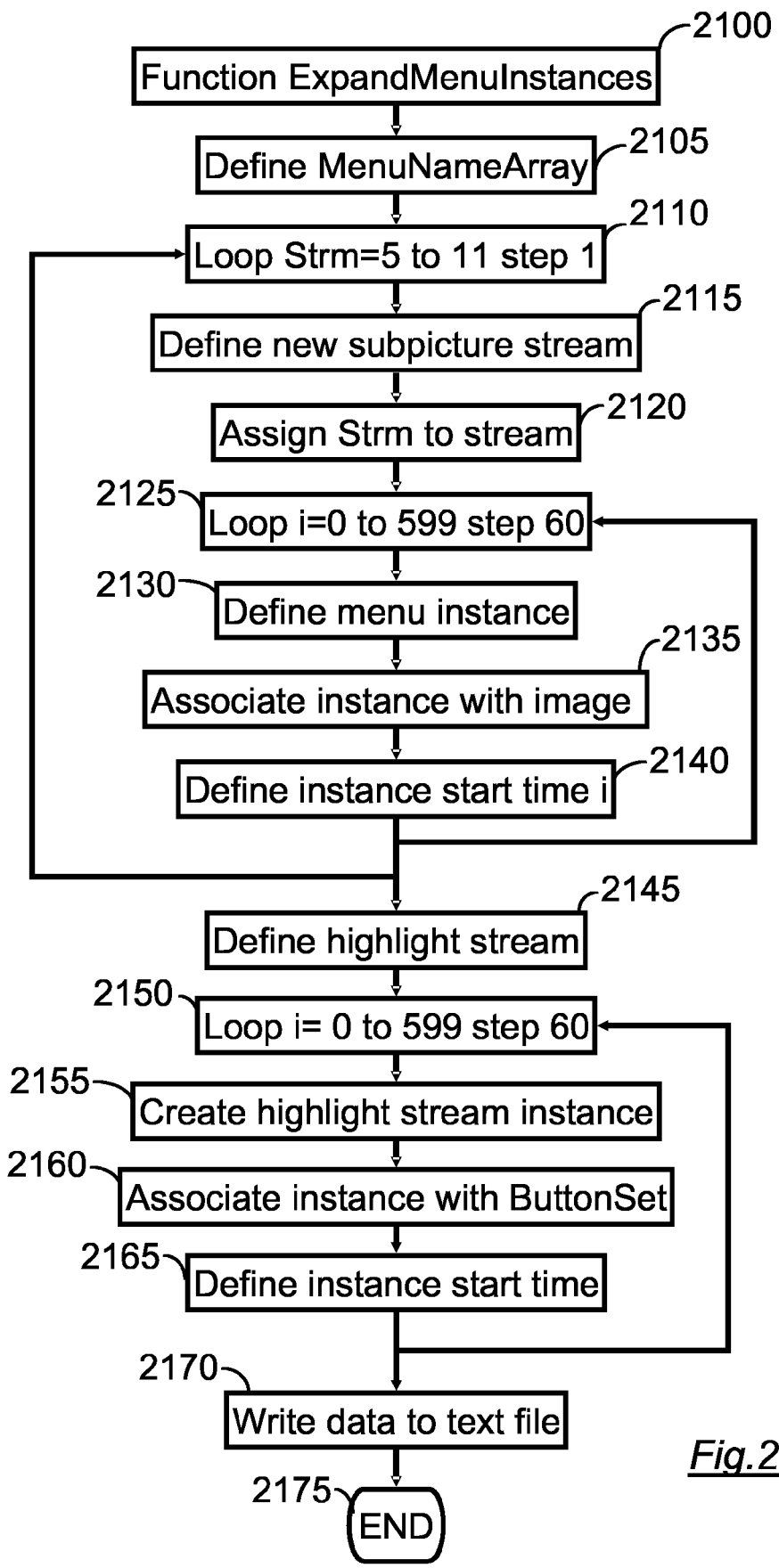
FIG. 21 is a flow diagram of a process for defining and expanding subpicture and highlight streams into multi-instance streams.

The foregoing software routine is executed and operates as follows, with reference to the flow diagram in FIG. 21. The routine is started in a first step 2100. In a next step, 2105, MenuNameArray is defined. Next, in step 2110, the first outer iterative loop is initiated by setting Strm to equal 5 and increment in steps of 1 to 11. For each iteration of the loop, in step 2115, a new subpicture stream is defined and, in step 2120, the current value of Strm is assigned to the subpicture stream. Also within the first outer loop, the inner loop is initiated, in step 2125, by setting i to equal 0 to 599 in steps of 60. For each iteration of the inner loop, in step 2130, a menu instance for the current subpicture stream is defined, in step 2135 the instance is associated with an image from MenuNameArray, determined by array pointer Strm and, in step 2140, the instance is assigned a start time, determined by the current value of i. Next, in step 2145, a highlight stream is defined and, in step 2150, the final iterative loop is initiated, by setting i to equal 0 to 599 in steps of 60. For each iteration of this loop, in step 2155, a highlight stream instance is defined, in step 2160 the instance is associated with the pre-defined menu button set definition "ButtonSet" and, in step, 2165, the instance is assigned a start time according to the current value of i. Next, in step 2170, all menu stream and highlight stream information is written to a text file. Finally, the routine ends in step 2175.

In simple terms, the routine creates a twenty second subpicture stream SStream for each menu configuration and, for each subpicture stream, the routine creates ten menu instances. Each menu instance uses a pre-defined menu image, which is pre-stored as a bitmap file. The result is seven complete subpicture streams, corresponding to subpictures Subpc5 to Subpc11, as illustrated in FIG. 16. Finally, the routine generates a button set stream HStream, using the button set definition shown in FIG. 17, and replicates instances of the definition, again, every two seconds, in order to coincide with the menu instances in the subpicture streams. It will be appreciated that a routine of this kind may be adapted by the skilled person to generate a hierarchical menu structure of the aforementioned kind in a most convenient manner.

An exemplary output text file representing an expanded menu subpicture definitions, resulting from compiling and executing the foregoing routine, is illustrated in FIG. 22. Not all instances for each menu subpicture are shown, for brevity only. An exemplary output text file representing an expanded menu button set definition, resulting from compiling and executing the foregoing routine, is illustrated in the table in FIG. 23.

These two output text files are used in step 2040 of the authoring process as an input to define the menu subpicture and highlight streams. In practice, the process parses each line of the text files and generates for each instance appropriate bytecodes, which comply with the DVD-Video specification.

As has been described above, according to the present embodiment, if a viewer for example selects from the Bonus menu (FIG. 5) any of the menu options Documentary, Quiz or Photo Gallery, DVD playback departs from the movie, redirects to the respective content and, when playback of that content is complete, resumes playback of the movie at the point from where playback departed. This facility is to some extent provided in the infinifilm example, which is described above, wherein each pop-up menu, which only appears at the start of a scene, allows a user to redirect to alternative content and then resume playback of the main movie. It is relatively straightforward to achieve such playback control. Since each item of alternative content can only be accessed from one pop-up menu, which occurs at only one predetermined point in the movie, the resume point of the movie after replaying the item of alternative content is always the same for that item of alternative content. As a result of the resume point being pre-determined in this way, it can be hard-coded into the playback program control for each item of alternative content. This method, however, cannot be applied directly in the present embodiment, since the user can access the menu hierarchy, and cause playback of the alternative content (for example, the Documentary option), at practically any time. As such, a departure point and a respective resume point cannot be pre-determined as such and can, potentially, be different each time the option is selected. Accordingly, it is necessary to establish the departure point whenever a re-directing menu option is selected.

Figure 24:
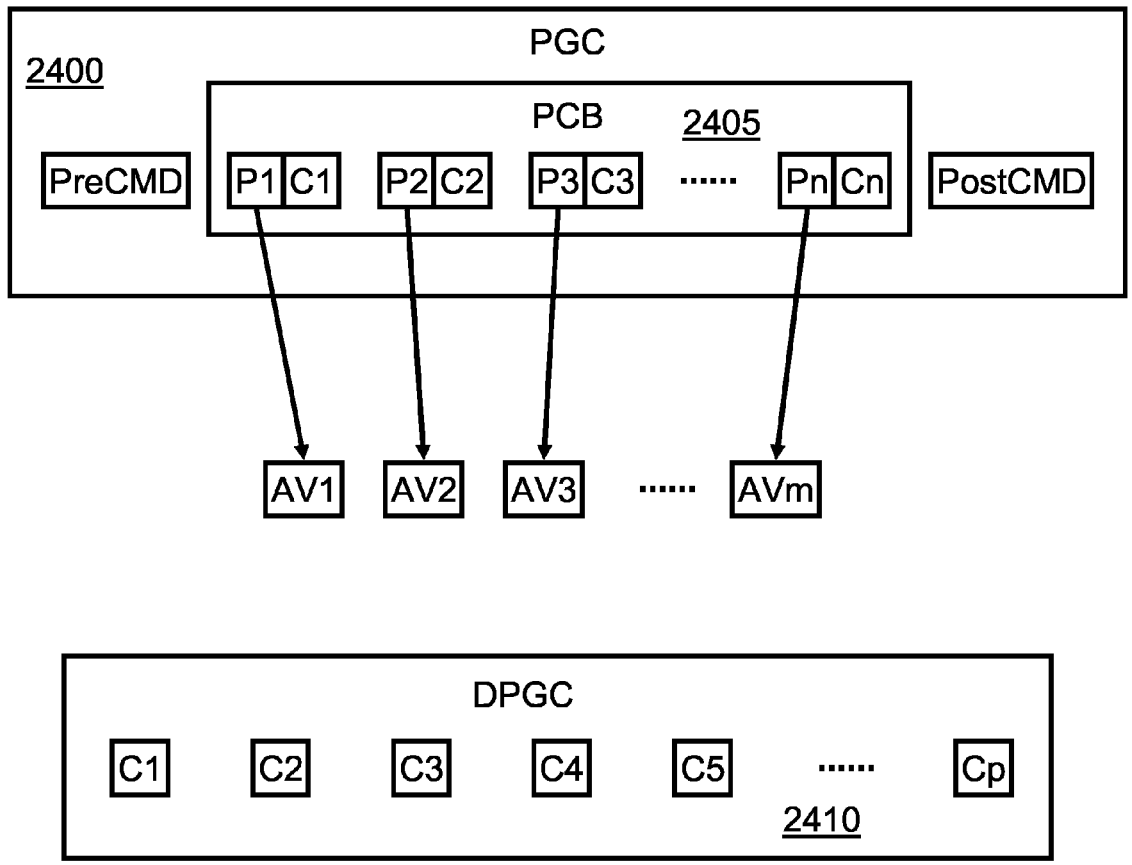
FIG. 24 is a diagram illustrating the format of a PGC and a dummy PGC.

As has already been described with reference to the diagram in FIG. 19, DVD content comprises audiovisual content split into cells AV1, AV2, . . . AVm and program control information split into program chains PGC1, PGC2, . . . PGCn. As illustrated in the diagram in FIG. 24, this time in slightly more detail, each PGC 2400 typically contains a program control block (PCB) 2405, which contains an ordered list of pointers P1, P2, . . . Pn, which dictates the replay order of the cells AV1, . . . AVm. The replay order is usually sequential. In addition to the pointers, a PGC may contain navigation commands including pre-commands, Pre-CMD, which precede the cell pointers, post commands PostCMD, which follow the cell pointers, and cell commands C1, C2, . . . Cn, which execute after the respective cell has been played. Another kind of PCG, called a dummy PGC, or DPGC 2410 hereinafter, may contain only navigation commands, C1, C2, . . . Cp, and no PCB.

Navigation commands, which are similar to CPU instructions that execute on a typical personal computer, can be used to vary the playback behaviour of a DVD product and can be used to set a resume point, according to embodiments of the present invention, as follows.

In one example, during DVD authoring, menu instances are each associated with a cell of the movie audiovisual content. The association may be a one to one mapping, for example, where each cell substantially coincides with one menu instance. In this case, using the example above, each cell would be about two seconds long and cell boundaries would generally coincide with menu instance boundaries on the timing diagram of FIG. 16. Alternatively, the association may be a one to many mapping, for example, where each cell substantially coincides with several plural n menu instances. The significance of the mapping ratio is thus. A cell is the smallest addressable block of audiovisual content, and a resume point can only occur at the start of a cell. Using a one to one mapping, therefore, the resume point would occur at the start of the same cell in which the departure point occurred, meaning that a resume point could occur a maximum of two seconds before the departure point Using a one to many mapping, the resume point would still occur at the start of the respective cell, but the departure point could be during any of the n menu instances that are associated with the cell. The resume point could therefore be up to 2n seconds, or n menu instance periods, before the departure point. A selected mapping ratio depends on a desired cell structure of the DVD content and also on how close together departure and resume points are required to be.

Figure 25:
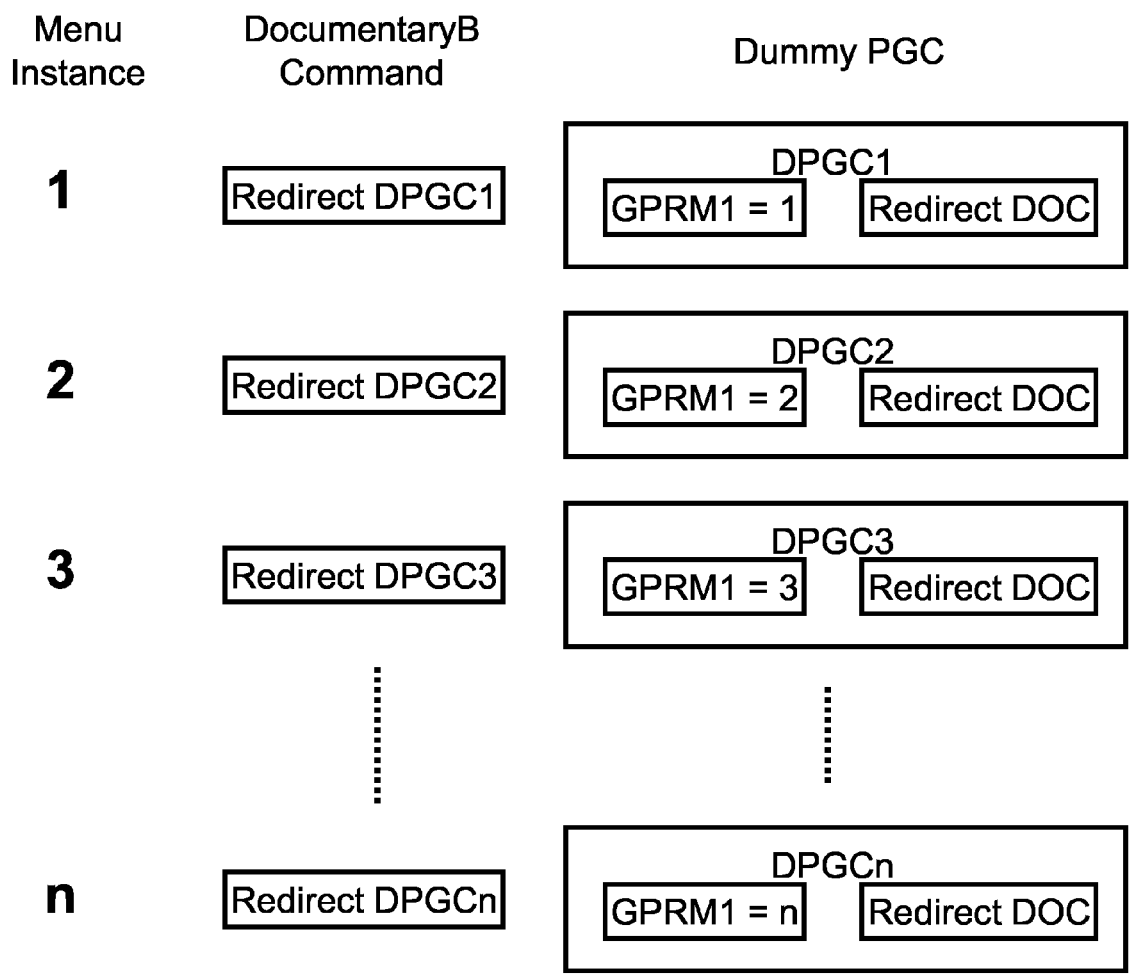
FIG. 25 is a diagram illustrating the form of the commands associated with playback redirecting menu options and dummy PGC according to an exemplary embodiment of the present invention.

Assuming in a preferred example that there is a one to one mapping of cells to menu instances, and there are 100 cells, then each menu instance needs to be adapted to reflect the association. Specifically, as illustrated in FIG. 25, each command that is associated with a redirecting menu option button, for example the Documentary menu button, DocumentaryB, needs to be different for each menu instance 1, 2, 3, . . . n. For example, if the departure point from the movie is during the third cell, then selecting DocumentaryB executes a command, which causes program control to redirect to DPGC3. DPGC3 contains commands, which, respectively, assign the value '3' to a first general parameter and cause playback to continue by branching to PCG DOC, which is the PGC associated with playing back the documentary.

Figure 26:
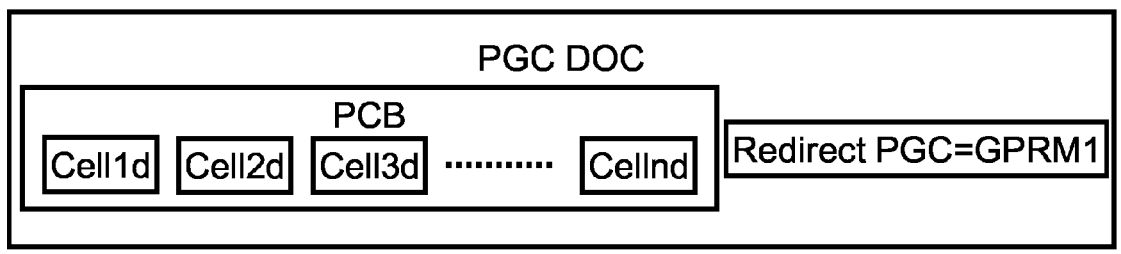
FIG. 26 is a diagram illustrating the form of a PGC item for playing back alternative content.

As illustrated in FIG. 26, PGC DOC contains pointers (Cell1$d$, Cell2$d$, . . . Cellnd), which causes the DVD player to replay the documentary, cell by cell. When the documentary content has replayed in full, a post command of PGC DOC causes redirection to a PGC, which is identified as the value of general parameter GPRM1. In this example, GPRM1 has been assigned the value 3, and so movie playback resumes using PGC 3. According to the diagram in FIG. 27, PGC 3 contains cell pointers (Cell3, Cell4, Cell5, . . . Cell100). Accordingly, the movie resumes playback from the beginning of cell 3, which is the cell from which movie playback departed in response to DocumentaryB being selected.

Figure 27:
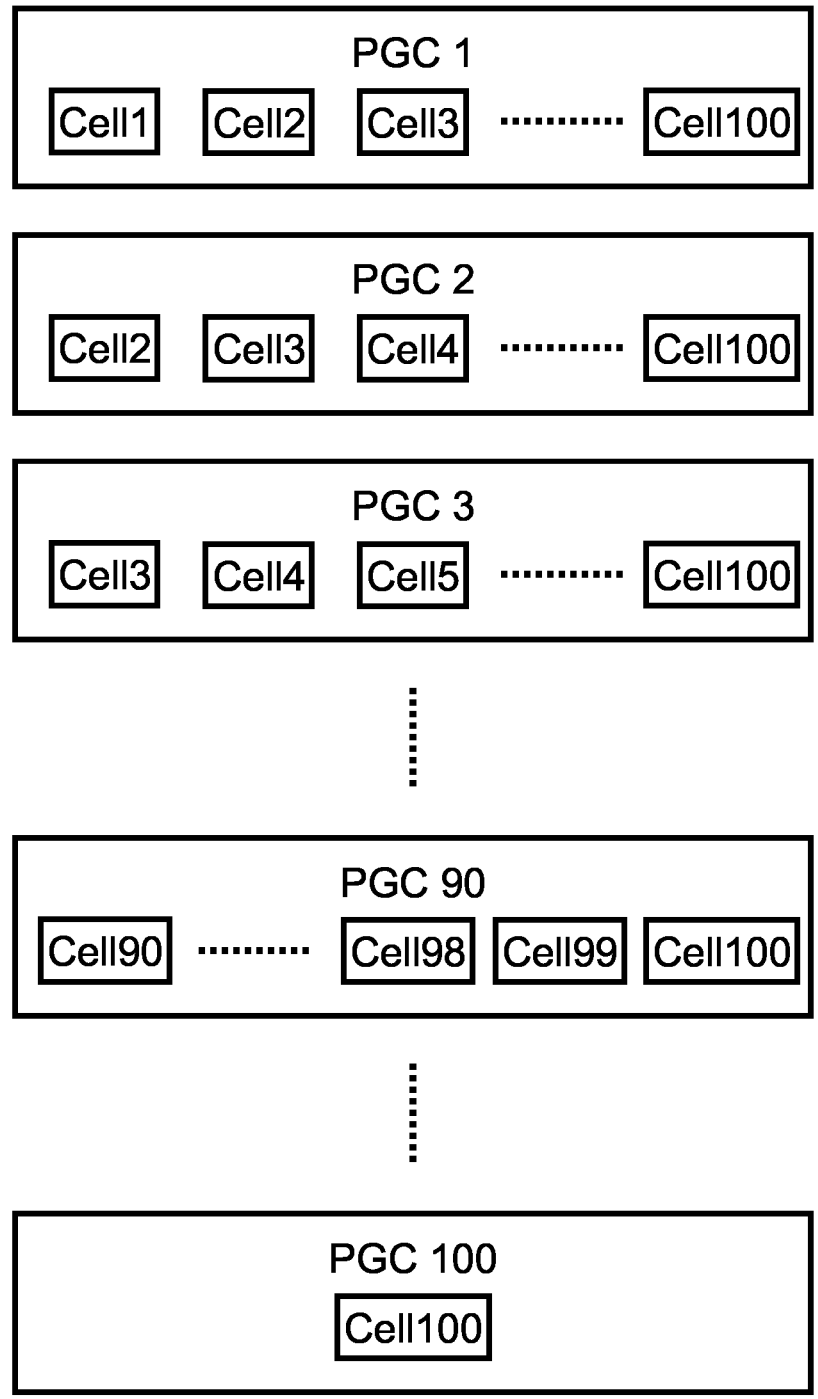
FIG. 27 is a diagram illustrating a group of PGC items for playing back audiovisual content from various different starting cell positions.

Referring to FIGS. 25, 26, and 27, it is clear that an appropriate resume point can be generated for any selected departure point.

Clearly, the foregoing novel process for resuming playback at the correct position on the DVD requires a number of enhancements to be made to a DVD authoring procedure. First, the DVD content needs to include an additional DPGC and an additional PGC for each cell of the movie. In the foregoing example, the movie comprises 100 cells. In this case, therefore, the DVD content requires 99 additional DPGC and PGC entries. The figure is 99 and not 100 since a first PGC, which replays the movie from the beginning of the first cell, already exists to control playback of the entire movie. Of course, the movie may have more or fewer cells and the association between cells and menu pointers may be one to many, as has been described.

In addition to a need to generate additional DPGC and PGC entries, the each menu stream instance and respective highlight stream instance needs to be associated with particular cells. The block of iterative code from above may be adapted for this purpose as follows:

```
Define a new highlight stream;
Define Iterative Loop (i = 0 to < 20 * 30 step
  60)
{
    Create a highlight stream instance -
    'HStream';
    Associate the instance with a pre-defined
    menu button set ("ButtonSet",
    CellPointer=Int(i/60+1));
    Define a start time of the instance as the
    i-th frame;
}
```

In this example, the code is adapted by the addition of the parameter 'CellPointer=Int(i/60+1)'. The value of this parameter increases from 1 to 100 in steps of 1 as the loop iterates, and is passed to a procedure that sets up the highlight stream instances. In effect, each value, 1, 2, 3, . . . , 10, of CellPointer represents a different DPGC(1, 2, 3, . . . ,n), which is pointed at by a respective re-directing menu button (DocumentaryB, QuizB and PhotoGalleryB) of each menu instance. In this way, each menu instance is associated with an appropriate and different definition of a button set. The respective DPGC and PGC entries can be generated using a similar iterative loop.

The foregoing process requires a DPGC to be generated for each cell of the movie. Each such DPGC has hard-coded into it a value that corresponds to a new PGC, which, in effect, causes movie playback to resume from the correct cell. This process can be simplified by removing DPGC instances in the following manner.

First, a command associated with a redirecting menu button, for example the Quiz button, QuizB, is generated, which, firstly, loads into general parameter 1, GPRM1, a value CellID, which corresponds to the current cell that is being played back and, then, jumps to the documentary content PGC. As a result the documentary content replays. Next, as in the foregoing process, a post command of the documentary PGC causes redirection to an appropriate movie PGC.

An alternative method for resuming movie playback at the correct point does not involve generating additional PGC entries, as will now be described. As in the previous example, a command associated with a redirecting menu button, for example the Quiz button, QuizB, firstly, loads into general parameter 1, GPRM1, a value CellID, which corresponds to the current cell that is being played back and, then, jumps to the documentary content PGC. In this case, however, when the documentary has finished playing back, a post command of the documentary PCG redirects playback to the beginning of the main movie PGC. The movie PGC contains a precommand, which causes playback from within the PGC to start at the cell from where playback departed. Clearly, when playback of the movie is first chosen by a viewer, it is important that CellID is pre-loaded with the value of the first cell of the movie, to ensure that playback the first time starts at the beginning of the movie.

Another method for resuming movie playback at the correct point involves the use of the part-of-titles construct (PTT) in DVD-Video. A PTT is commonly referred to as a Chapter Point, which is a branch point or marker in a video stream. Program control can jump to any given Chapter Point in a presentation and begin playback from that point. There can be up to 99 Chapter Points per PGC. For example, there can be 99 Chapter Points in a movie or other presentation that is a sequential, single PGC title. Obviously, there can be more Chapter Points if a presentation uses plural PGC. According to embodiments of the present invention, Chapter Points can be inserted by adapting an iterative process of the aforementioned kind. For example, a Chapter Point can be inserted each time a new menu instance is created. The Chapter Points can be spread out equally or they can, instead, be placed more densely in some areas than in others. For example, if a menu is available for only a small portion of a movie then the Chapter Points may be frequent where the menu is available, for example at one or two second intervals to coincide with the menu instance period. At points where there are no menus the Chapter Point occurrences may be less frequent, or there may be none at all.

Using a Chapter Point method for resuming, when a menu option is selected that causes playback of a different presentation, the identity of a closest previous Chapter Point is loaded into a general register. When the different presentation is complete, the value in the general register is used to jump to the respective Chapter Point in order to resume playback as near as possible to the departure point.

Use of Chapter Points for defining a resume point has the advantage that only one PGC is required. A potential disadvantage is the limit on numbers of Chapter Points, which means their occurrence may be infrequent in long presentations, such as movies. Thus, a resume point may occur a significant time before a respective departure point. This disadvantage may be overcome by using plural PGC.

As with software coding, which typically permits several ways for a problem to be solved, it will be appreciated by those skilled in the art that there may be several ways of causing resume to occur at a point near to a departure point in a main movie presentation or the like. As such, the foregoing three methods are only intended to be exemplary. In particular, where reference has been made to a "command", it should be understood that the associated function may need to be implemented in practice as plural commands.

The description accompanying FIG. 16 states that a menu of the aforementioned kind may be available during an entire presentation or only for a part or parts thereof. It will be appreciated that the diagram in FIG. 16 shows a menu that is present for all twenty seconds of the respective video presentation. The menu of FIG. 16 may be adapted, for example, by removing the first five two-second entries in each of the Subpc5-Subpc11 and HGLT streams. As a result, the menu would only be available for the second ten seconds of the video presentation.

Alternatively, an entirely different menu may replace the first five entries. In this case, one menu would be available for the first ten seconds and a different menu would be available for the second ten seconds. In principle, different menus may be defined in each subsequent two-second timeframe. Embodiments of the present invention take advantage of this principle, as will now be described.

Consider the well-known James Bonds movies, for example, which are renowned for including multiple exotic filming locations, expensive jewellery, designer clothes, prestige cars and well-known actors and actresses. In an exemplary, hypothetical movie of this kind, a first scene comprises an aerial shot of an exotic location, a second scene shows an actor driving up to a casino in a sports car, and a third scene shows the actor, who is wearing designer clothes, inside the casino.

Figure 28:
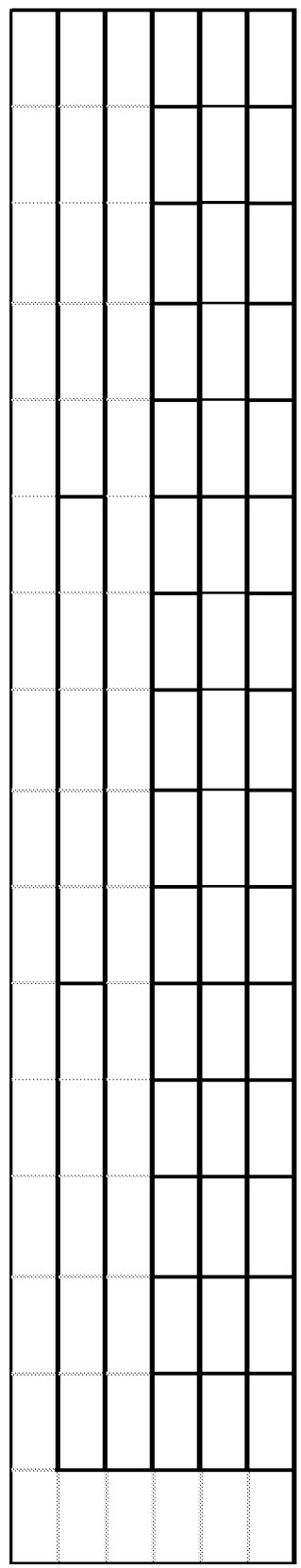
FIG. 28 is a table defining the menu button set of an alternative menu structure.

The diagram in FIG. 28 is a timing diagram, which is similar to the diagram in FIG. 16. In FIG. 28, a video stream (Video) is partitioned into three ten second sections (Scene 1, Scene 2, Scene 3), which represent each of the aforementioned three movie scenes. The timing diagram in FIG. 28 also illustrates an audio stream (Audio), two subpicture streams (Subpc1, Subpc2) and a button highlight stream (HGLT). The first subpicture stream (Subpc1) is an 'Active Menu' stream and the second subpicture stream (Subpc2) is an 'Option Menu' stream. As shown, the subpicture menu streams are refreshed every two seconds, as in FIG. 16, although the refresh rate may be higher or lower.

Figure 29A:
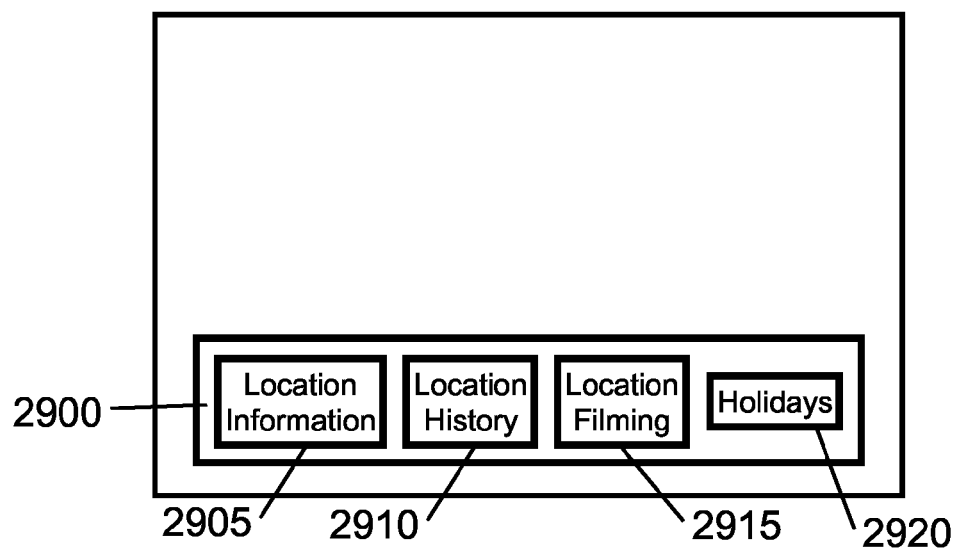
FIG. 29 illustrates three screenshots of three possible first tier menus that are accessible during the playback of a single presentation.

The Active Menu buttons, as before, are invisible to a viewer of the movie. When the viewer presses the right arrow key on a remote controller, during the first scene (Scene 1), the Active menu button behaves in a similar fashion to SelectMenuB in FIG. 9, and causes the display of an on-screen menu 2900, defined by the Option Menu stream, as illustrated in the diagram in FIG. 29a. The menu 2900 in FIG. 29a has four buttons: Location Information 2905; Location History 2910, Location Filming 2915 and Holidays 2920. The Location Information button 2905 causes overlay text to appear (not shown), which provides general information about the exotic location; for example, population, seasonal temperature, geographic information etc. The Location History button 2910 causes the movie to stop replaying and a documentary about the history of the exotic location to replay instead. The Location Filming button 2915 causes the movie to stop replaying and a documentary showing behind-the-scenes footage taken during the shooting of the movie to replay instead. The Holiday button 2920 causes overlay text to appear (not shown) which provides information, for example web site addresses, for a holiday bookings company that sells holidays for the exotic location. The web site address may be a web hyperlink, which a viewer can access, if the playback apparatus incorporates an appropriate web browser application.

Figure 29B:
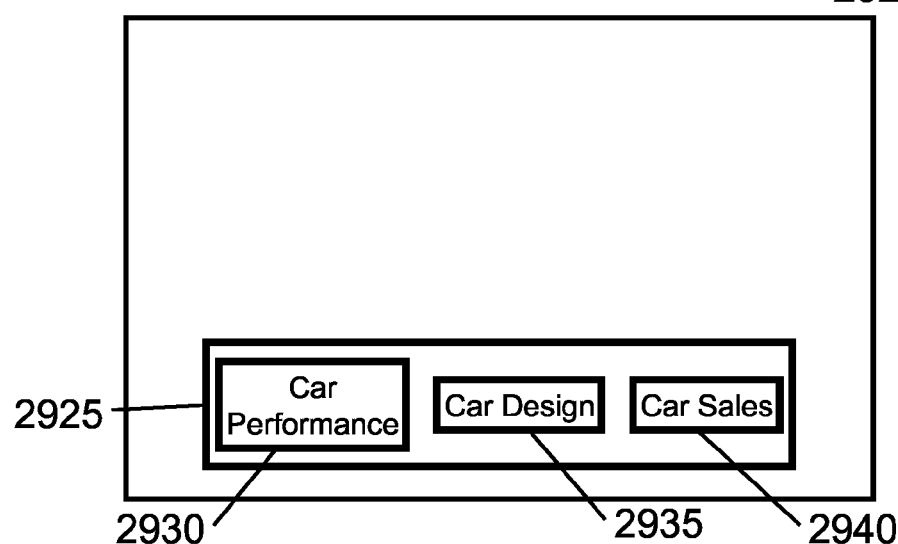

When a viewer presses the right arrow key on the remote controller during the second scene (Scene 2), the Active Menu button causes the display of a second on-screen menu 2925, defined by the Option Menu stream, as illustrated in the diagram in FIG. 29*b*. The menu in FIG. 29*b* this time has three buttons: Car Performance 2930, Car Design 2935 and Car Sales 2940. The Car Performance button 2930 causes overlay text to appear (not shown) which provides performance information about the sports car; for example, top speed, acceleration, engine capacity etc. The Car Design button 2935 causes the movie to stop replaying and a documentary about the design and production of the sports car to replay instead. The Car Sales button 2940 causes overlay text to appear (not shown) which provides sales information, for example car dealer information, to appear.

Figure 29C:
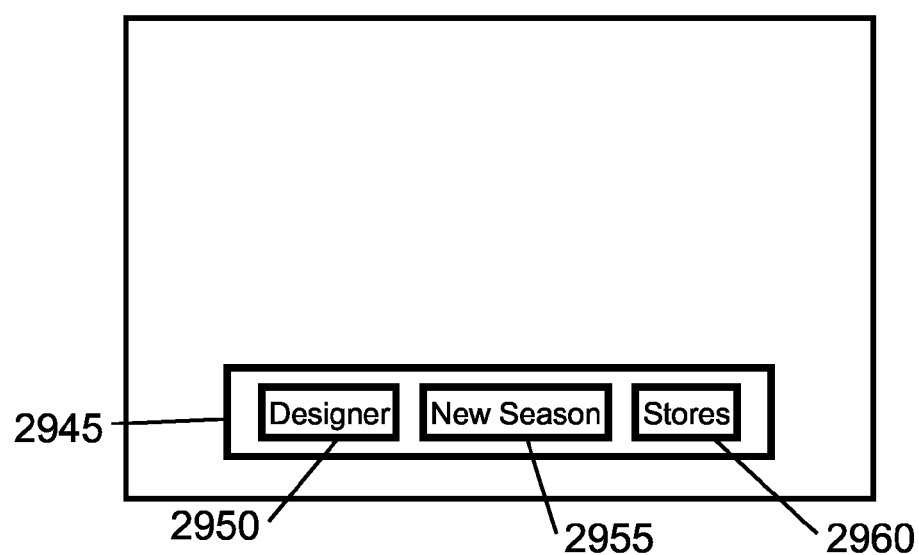

When a viewer presses the right arrow key during the third scene, the Active Menu button causes the display of a third on-screen menu 2945, defined by the Option Menu stream, as illustrated in the diagram in FIG. 29*c*. The menu in FIG. 29*c* on this occasion has three menu buttons: Designer 2950, New Season 2955 and Stores 2960. The Designer button 2950 causes the movie to stop replaying and a documentary about the clothes designer to replay instead. The New Season button 2955 causes the movie to stop replaying and a documentary about all the new clothes by the respective designer to replay instead. The Stores button 2960 causes overlay text to appear (not shown) which provides information about where to buy the clothes.

For all menus in FIG. 29, the viewer uses the remote controller navigation keys to move between and select buttons in the normal way and once a documentary has finished replaying, the movie resumes replaying at the point from which replay was stopped.

According to the embodiment that has just be described, within each scene, the Active Menu button simply causes display of the Option Menu subpicture stream. In other words, the Active Menu does not need to change during playback. However, during each scene, the definition of the Option Menu does change. More particularly, the menu that is available for each scene matches the context of the scene. This principle can be used in many different scenarios.

Alternatively, the Active Menu may be arranged to change in each new scene to cause display of a different Option Menu subpicture stream. In this case, the Option Menu definition within each respective subpicture stream would not need to change. Instead, the effect of providing a different Option Menu at different points during playback is achieved by causing display of a different subpicture stream. This alternative solution suffers the disadvantage that more than one subpicture stream is required to define the different Option Menus, whereas the former solution provides the different Option Menus definitions within a single subpicture stream. However, this disadvantage may not be significant if the menu hierarchy is simple and there are sufficient, free subpicture streams for the plural Option Menu definitions. Of course, it would also be possible to use multiple Option Menu streams, one or more of which also has plural Option Menu definitions.

In any event, consider, for example, during the playback of a recorded football game, a menu might only be made available when an important point in the match occurs, for example a goal is scored. The menu might provide details of the scoring team's scoring statistics, a profile of the player who scores the goal or the like. Alternatively, the menu might give the viewer the option to view the goal-scoring event, or indeed any of the action, from different camera angles. In other words, the menu could provide buttons to facilitate on-screen camera-angle-switching control.

The use of different camera angles may also find application in other recorded event footage, for example a music concert. In this case, the menu may be available at some or all times and a viewer displays, or 'brings up' the menu by pressing a key, for example a right arrow key or select key of the remote controller. The menu may include at least buttons for changing camera angle: for example, one angle might display an entire stage, another angle may be a close-up view of a lead singer and a third angle might show a close up view of a drummer. Once the angle has been switched, the menu may remain displayed permanently, disappear after a predefined time or be removed by the viewer pressing an appropriate key of the remote controller.

In general, providing a viewer with the ability to bring up and then close down a menu, without disturbing playback of a main presentation, is a highly beneficial feature, according to embodiments of the present invention.

Different menus and different respective options might be made available at different times in a match, concert or other presentation. At other times, there may not be any available menu. The presence, or indeed absence, of a menu at any particular time may be indicated by the appearance of text, or a graphic indicator, preferably in an unobtrusive area of the screen, for example in an upper corner. The text or graphic indicator may be in a subpicture stream that may be the same stream as, for example, an Active Menu, or in a different subpicture stream.

The menus illustrated in FIG. 29 have two tiers; a first, invisible Active Menu tier and a second tier, which provides the visible viewer options. Of course, the or at least some of the menus may provide hierarchies having more than two tiers.

In practice, any supportable number of different menus or menu hierarchies can be provided during the playback of audiovisual content. For example, the menu or menu hierarchy could change each time the context of the audiovisual content changed. The menus might provide access to background information, advertising or other commercial information, documentary information or any other kind of relevant information.

In some embodiments of the present invention, it may be advantageous for a viewer to be provided with information about how long a particular menu will be available for. For example, if a particular menu relating to a sports car is available for only ten seconds, during a respective scene of a movie, it might be useful for the viewer to know that information.

Figure 30:
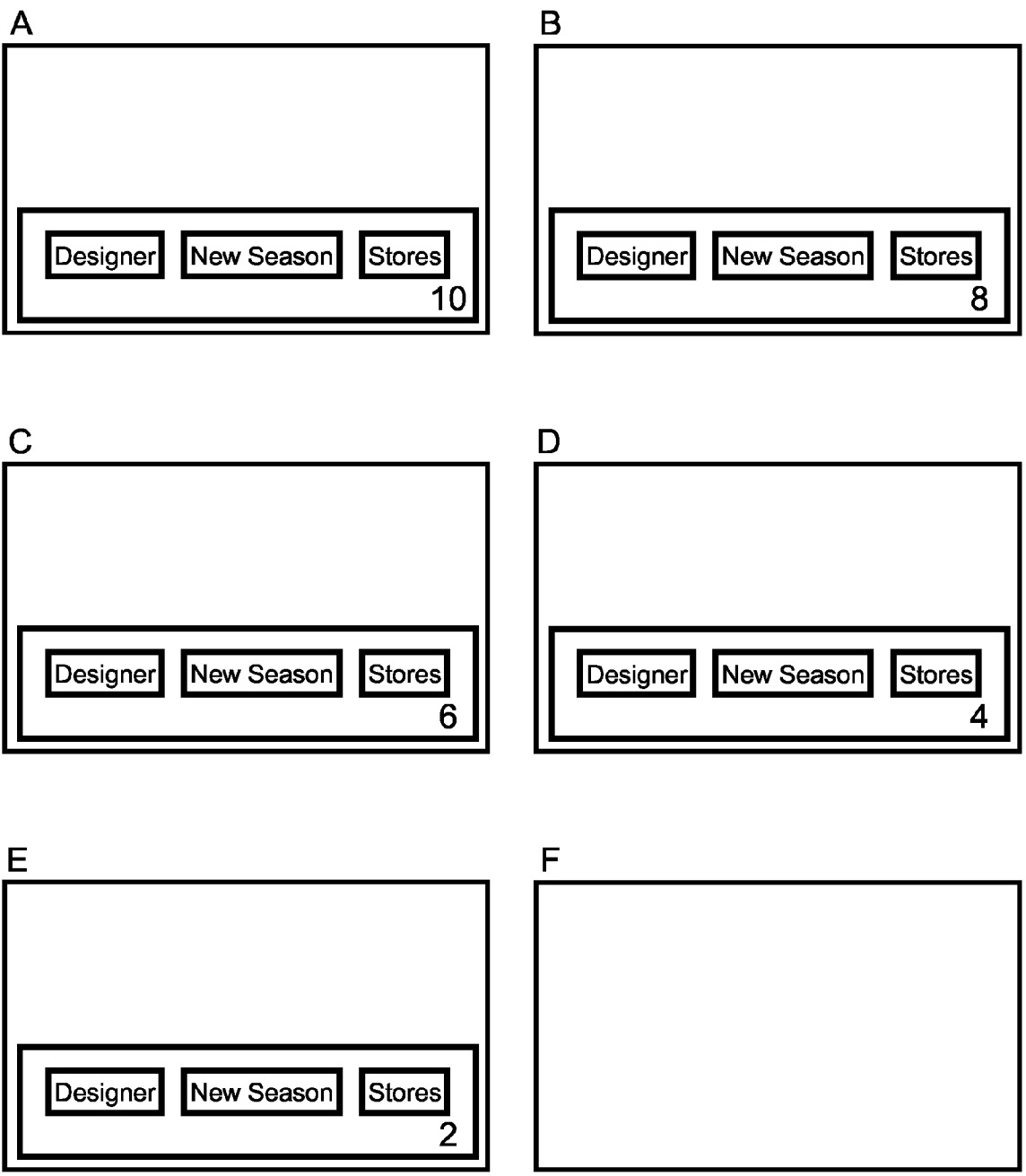
FIG. 30 illustrates six screenshots, which illustrate a numeric countdown timer implemented using menus according to an embodiment of the present invention.

Advantageously, menus according to the exemplified embodiments of the present invention are refreshed frequently, for example every one or two seconds, as has been described in detail above. This feature can be utilised in order to implement a simple countdown timer operation. For example, each menu image can be generated with a unique time or time indicator, which is a simple textual or graphic indicator. For example, FIG. 30 illustrates six screenshots, A-F, which show the same menu at two-second intervals. The first menu instance, for example, which is available at the beginning of a scene, displays a "10" seconds indication, the second menu instance, which appears after two seconds, displays "8" seconds, and so on, until the fifth menu instance displays "2" seconds. The menu has disappeared in the sixth screenshot. All aspects of the menu, apart from the timing information, remain the same as before. Thus, a viewer sees what appears to be an animated countdown timer. Of course, the viewer could pause the movie in the event they wanted a particular menu, or respective overlay text, to remain available or visible.

Figure 31:
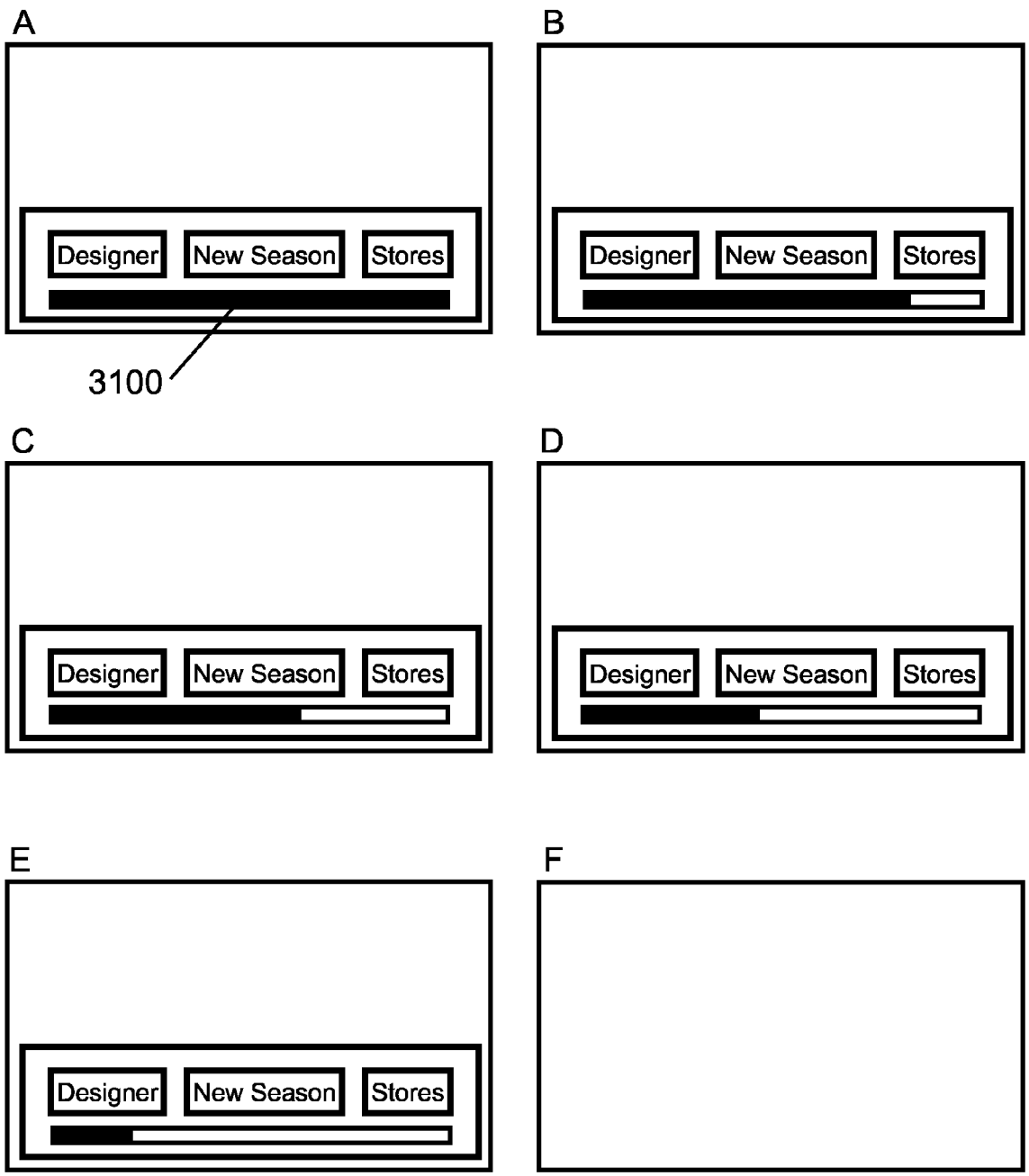
FIG. 31 illustrates six screenshots, which illustrate a graphical countdown timer implemented using menus according to an embodiment of the present invention.

An alternative menu arrangement with countdown timing information, is illustrated by the screenshots, A-F, in FIG. 31. This time, the countdown timer is in the form of a graphical bar 3100, which decreases in length as the remaining time for the menu decreases. In the first screenshot A, the bar 3100 is black; in the next screenshot B the bar is black along only 80% of its length; in the next screenshot C the bar is black along only 60% of its length; in the fifth screenshot the bar is black along only 20% of its length and in the sixth screenshot F the bar and menu have disappeared. This kind of countdown timer is well-known and used widely in the software art, for example when software is installing and a viewer is given an indication, using a similar bar, of how much more time the installation will take.

A countdown timer of the aforementioned kind finds application independently of menus as such. For example, the countdown timer might indicate how much time is left in a scene of a movie or of an entire movie. The countdown timer could be brought up and closed down by a viewer using one of the aforementioned mechanisms.

It will be appreciated by those skilled in the art that various changes and modifications might be made to any of the foregoing methods, processes and system without departing from the scope of the invention, as defined in the appended claims.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of authoring an audiovisual product, the method comprising the steps of:
   providing audiovisual content;
   generating at least a first menu and a second menu and for each menu generating menu definition data, each menu comprising at least one menu option;
   for each menu, expanding the menu definition data into a sequence of individual instances, which are arrange to coincide, temporally at least, with a playback sequence of the audiovisual content, wherein the expanding is automated by a computer program executing on a computer and includes the steps of running an iterative loop to create, for each iteration of the iterative loop, at least one instance and associated timing information, which is defined according to a variable as adjusted for each iteration of the iterative loop, and adding each instance of the sequence according to its associated timing information;
   arranging the first menu to be displayed during the playback of the audiovisual content; and
   arranging a menu option of the first menu to cause display of the second menu during playback of the audiovisual content.

2. A method according to claim 1, comprising the steps of:
   generating at least one first-level menu comprising at least one menu option and at least two second-level menus, each second-level menu comprising at least one menu option that is different from the menu option or all menu options of the or each other second-level menu;
   arranging the at least one first-level menu to be displayed during one or more portions of the playback of the audiovisual content and arranging a menu option of the or each first-level menu to cause display of a different second-level menu at different times during the playback of the audiovisual content.

3. A method according to claim 2, wherein the same first-level menu is arranged to cause display of different second-level menus at different times during playback.

4. A method according to claim 2, wherein different first-level menus are arranged to cause display of different second-level menus at different times during playback.

5. A method according to claim 1, further comprising the step of generating one or more additional menus, each having at least one menu option, and arranging an additional menu to be displayed by a menu option of the first, second or another additional menu during playback of the audiovisual content.

6. A method according to claim 1, comprising the step of defining a menu hierarchy, comprising plural menus, wherein a menu that is higher in the hierarchy has an option to cause display of a menu that is lower in the hierarchy during playback of the audiovisual content.

7. A method according to claim 6, comprising the step of providing a menu that is lower in the hierarchy with a menu option to display a menu that is higher in the hierarchy.

8. A method according to claim 1, comprising the step of providing a menu image for at least one menu.

9. A method according to claim 8, wherein, a menu that is displayed by a menu option of another menu is arranged to comprise an image, which includes an image representing both menus.

10. A method according to claim 1, comprising the step of defining a cascaded menu hierarchy.

11. A method according to claim 1, wherein at least one menu is arranged to partially or fully overlay the audiovisual content during playback thereof.

12. A method according to claim 1, wherein each menu is arranged to partially or fully overlay the audiovisual content during playback thereof.

13. A method according to claim 11, wherein the at least one menu is arranged to fully overlay the audiovisual content during playback thereof.

14. A method according to claim 1, wherein at least one menu option that causes the display of another menu is arranged to be displayed transparently.

15. A method according to claim 1, wherein each menu option that causes the display of another menu is arranged to be displayed transparently.

16. A method according to claim 1, wherein at least one menu option that causes the display of another menu is arranged to be associated with a command that executes automatically on selection of that option.

17. A method according to claim 1, wherein each menu option that causes the display of another menu is arranged to be associated with a command that executes automatically on selection of that option.

18. A method according to claim 1, wherein at least the first menu is arranged to comprise plural menu options, wherein a first menu option is arranged to provide the user with a route to a second menu option, which is arranged to cause the display of another menu.

19. A method according to claim 18, wherein, the first menu option is provided with a route to the second menu option via a user activating or navigating away from the first menu option.

20. A method according to claim 18, wherein, the first menu option is arranged to be transparent.

21. A method according to claim 1, wherein the at least one menu option of the first menu is or are arranged to be transparent.

22. A method according to claim 1, comprising the step of providing additional audiovisual content and at least one redirection menu option, which is arranged to redirect playback to that audiovisual content during playback of the first mentioned audiovisual content.

23. A method according to claim 22, comprising the step of providing means for storing information, on user selection of said redirection menu option, which identifies a point in the playback of the first mentioned audiovisual content that coincides with user selection of the redirection menu option.

24. A method according to claim 23, further comprising the step of providing a means using said stored information, after playback of the additional audiovisual content has ceased, to resume playback of the first mentioned audiovisual content at or near the same said point.

25. A method according to claim 1, wherein the individual instances of the first menu or menus are arranged into one or more addressable data streams and the individual instances of the second menu or menus are arranged into one or more different addressable data streams.

26. A method according to claim 1, wherein there are plural second menus and the individual instances of each second menu are arranged into the same addressable data stream.

27. A method according to claim 26, wherein individual instances of the first menu or menus include a menu option that switches to a display of the addressable data stream of the second menu or menus.

28. A method according to claim 1, wherein there are plural second menus and the individual instances of each second menu are arranged into different addressable data streams.

29. A method according to claim 28, wherein individual instances of the first menu or menus include a menu option that switches to a display of one of the addressable data streams of the second menu or menus.

30. A method according to claim 1, wherein the individual instances of at least one menu differ in displayed appearance.

31. A method according to claim 30, wherein the difference between instances is arranged to change over time during playback of the audiovisual content.

32. A method according to claim 31, wherein the difference in appearance is arranged to provide an animation effect.

33. A method according to claim 30, wherein the difference in appearance is arranged to provide a timer.

34. An audiovisual product made using the method of claim 1.

35. A method according to claim 1, further comprising the step of manufacturing an audiovisual product.

36. A method according to claim 35, wherein the audiovisual product comprises an optical disc product.

37. A method according to claim 36, wherein the audiovisual product comprises an optical disc product conforming to the DVD-Video specification.

38. A method according to claim 1, comprising the step of storing authored audiovisual content on a storage medium.

39. A method according to claim 38, comprising the step of using the stored audiovisual content to manufacture an optical disc master.

40. A method according to claim 39, comprising the step of using the master to manufacture plural optical discs containing the audiovisual content.

41. An audiovisual content authoring system, which implements a method according to claim 1.

* * * * *